(12) United States Patent
Xue et al.

(10) Patent No.: US 11,109,332 B2
(45) Date of Patent: Aug. 31, 2021

(54) METHOD AND APPARATUS OF INITIAL ACCESS IN NEXT GENERATION CELLULAR NETWORKS

(71) Applicant: Samsung Electronics Co., Ltd., Suwon-si (KR)

(72) Inventors: Peng Xue, Suwon-si (KR); Anil Agiwal, Suwon-si (KR); Hyunseok Ryu, Yongin-si (KR); Hyunkyu Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 18 days.

(21) Appl. No.: 16/607,881

(22) PCT Filed: May 2, 2018

(86) PCT No.: PCT/KR2018/005109
§ 371 (c)(1),
(2) Date: Oct. 24, 2019

(87) PCT Pub. No.: WO2018/203672
PCT Pub. Date: Nov. 8, 2018

(65) Prior Publication Data
US 2020/0068512 A1 Feb. 27, 2020

Related U.S. Application Data

(60) Provisional application No. 62/556,142, filed on Sep. 8, 2017, provisional application No. 62/520,404, filed (Continued)

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0082* (2013.01); *H04W 72/005* (2013.01); *H04W 72/0453* (2013.01)

(58) Field of Classification Search
CPC .................................. H04W 56/001
See application file for complete search history.

(56) References Cited

U.S. PATENT DOCUMENTS

2017/0086186 A1 3/2017 Shuai
2018/0192404 A1* 7/2018 Maaref ................. H04L 5/0048
(Continued)

FOREIGN PATENT DOCUMENTS

WO 2017-010798 A 1/2017

OTHER PUBLICATIONS

Panasonic et al., 'WF on subcarrier mapping and PRB grid', R1-1703872, 3GPP TSG RAN WG1 Meeting #88; Feb. 16, 2017, Athens, Greece.
(Continued)

*Primary Examiner* — John D Blanton
(74) *Attorney, Agent, or Firm* — Jefferson IP Law, LLP

(57) ABSTRACT

A communication method and system for converging a fifth generation (5G) communication system for supporting higher data rates beyond a fourth generation (4G) system with a technology for internet of things (IoT) are provided. The communication method and system may be applied to intelligent services based on the 5G communication technology and the IoT-related technology, such as smart home, smart building, smart city, smart car, connected car, health care, digital education, smart retail, security and safety services. A method of a terminal for receiving data in a cellular network is provided. The method comprises receiving a synchronization signal block (SS block) including at least one synchronization signal and a broadcast channel
(Continued)

from a base station, identifying an offset between the SS block and a resource block (RB) grid from system information in the broadcast channel, and determining the resource block grid based on the offset.

15 Claims, 42 Drawing Sheets

Related U.S. Application Data on Jun. 15, 2017, provisional application No. 62/500,401, filed on May 2, 2017.

(51) Int. Cl.
*H04W 72/00* (2009.01)
*H04W 72/04* (2009.01)

(56) References Cited

U.S. PATENT DOCUMENTS

| | | | |
|---|---|---|---|
| 2018/0205512 A1 | 7/2018 | You et al. | |
| 2019/0253959 A1* | 8/2019 | Wei | H04W 48/16 |
| 2019/0380098 A1* | 12/2019 | Liu | H04W 72/04 |
| 2020/0274750 A1* | 8/2020 | Yl | H04W 72/0453 |
| 2020/0413359 A1* | 12/2020 | Li | H04W 74/0808 |

OTHER PUBLICATIONS

Panasonic et al., 'WF on subcarrier mapping and PRB grid', R1-1704040, 3GPP TSG RAN WG1 Meeting #88; Feb. 17, 2017, Athens, Greece.
Panasonic et al., 'WF on subcarrier grid', R1-1704095, 3GPP TSG RAN WG1 Meeting #88; Feb. 17, 2017 Athens, Greece.
Nokia et al., 'On the location of subcarriers within the PRB grid', R1-1703197, 3GPP TSG RAN WG1 Meeting #88; Feb. 6, 2017, Athens, Greece.
Extended European Search Report dated Mar. 16, 2020, issued in a counterpart European Application No. 18794869.0-1231 / 3602853.
ZTE: "Considerations on Channel Raster for NB-loT", 3GPP Draft; R1-160051 Channel Raster, 3rd Generation Partnership Project (3GPP), vol. RAN WG1, No. XP051064635; Jan. 11, 2016; Budapest, HU. Retrieved from the Internet: URL:http://www.3gpp.org/ftp/tsg_ran/WG1_RL1/TSGR1 _AH/LTE_NBloT_1601/Docs/.
Nokia Networks: "On the channel raster design for NB-loT", 3GPP Draft; R1-160172, 3rd Generation Partnership Project (3GPP), vol. RAN WG1, No. XP051064776; Jan. 12, 2016; Budapest, HU. Retrieved from the Internet: URL:http://www.3gpp.org/ftp/tsg_ran/WG1_RL1/TSGR1 _AH/LTE_NBloT_1601/Docs/.
Intel Corporation: "Operation mode indication and channel raster for NB-loT", 3GPP Draft; R1-160408-Intel-NB-IOT Rastermode, 3rd Generation Partnership Project (3GPP), vol. RAN WG1, No. XP051064167; Feb. 6, 2016; St Julian's, Malta. Retrieved from the Internet: URL:http://www.3gpp.org/ftp/tsg_ran/WG1_RL1/TSGR1 _84/Docs/.

* cited by examiner

[Fig. 1]
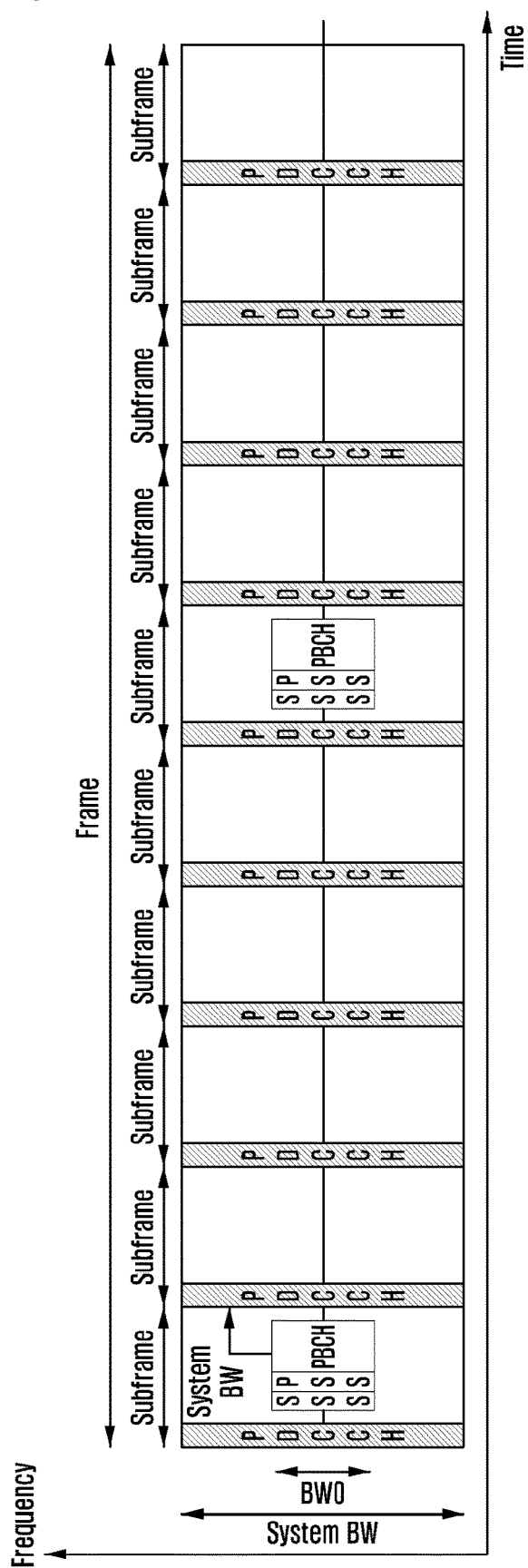

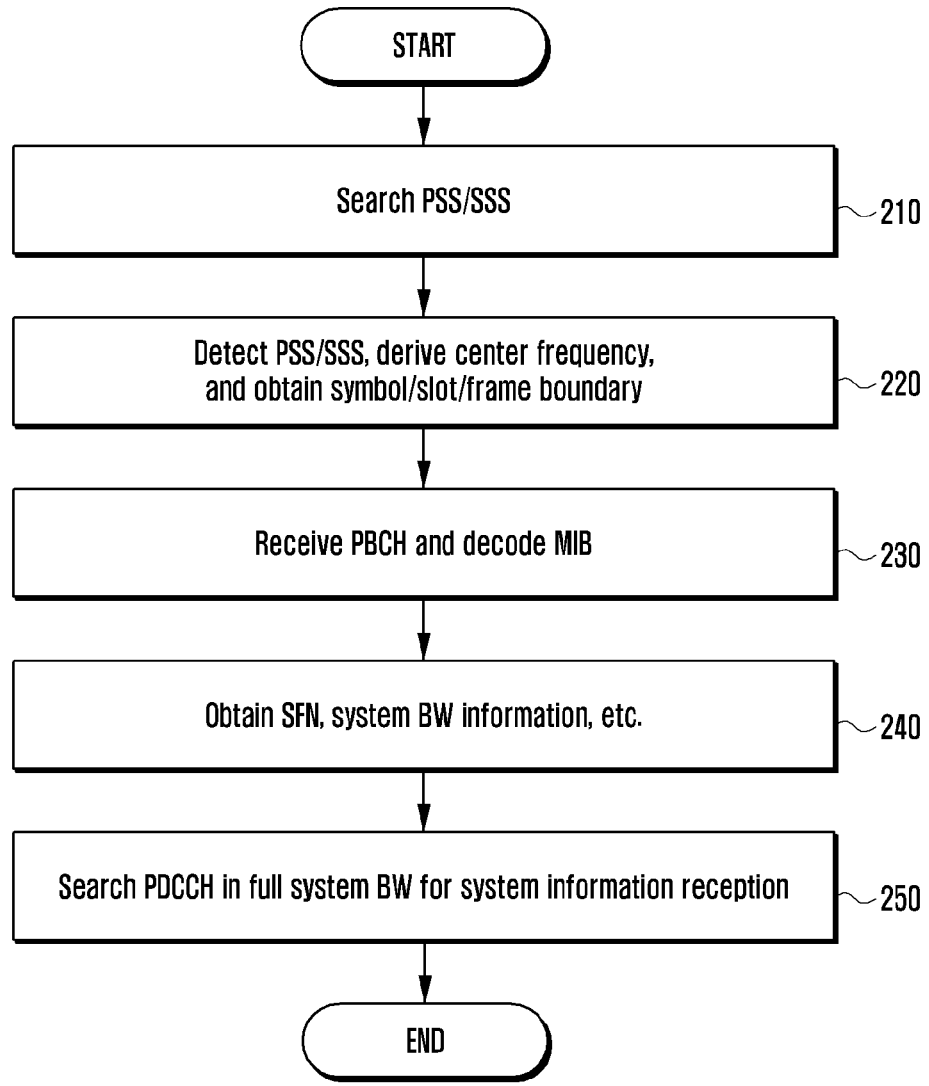
[Fig. 2]

[Fig. 3]
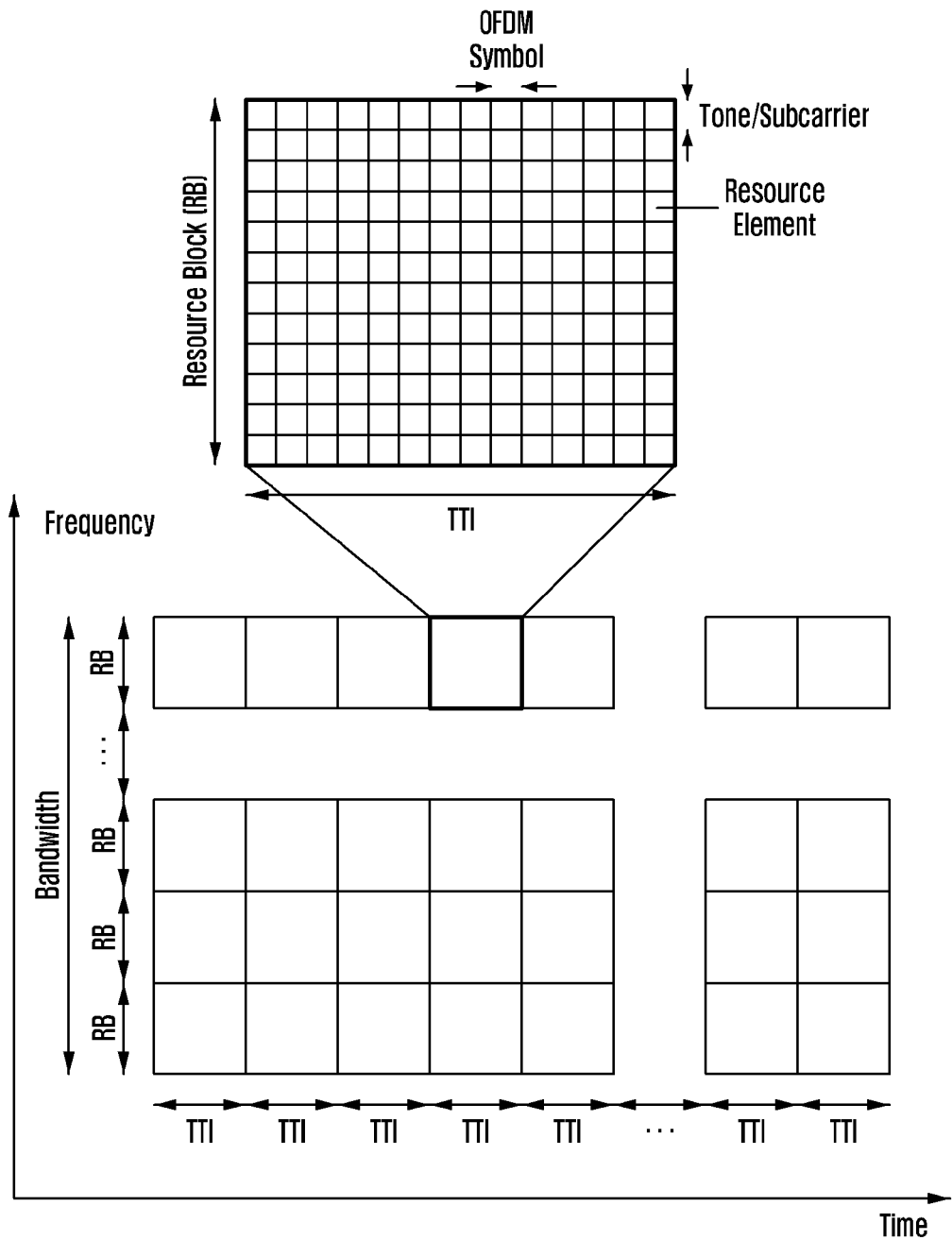

[Fig. 4]
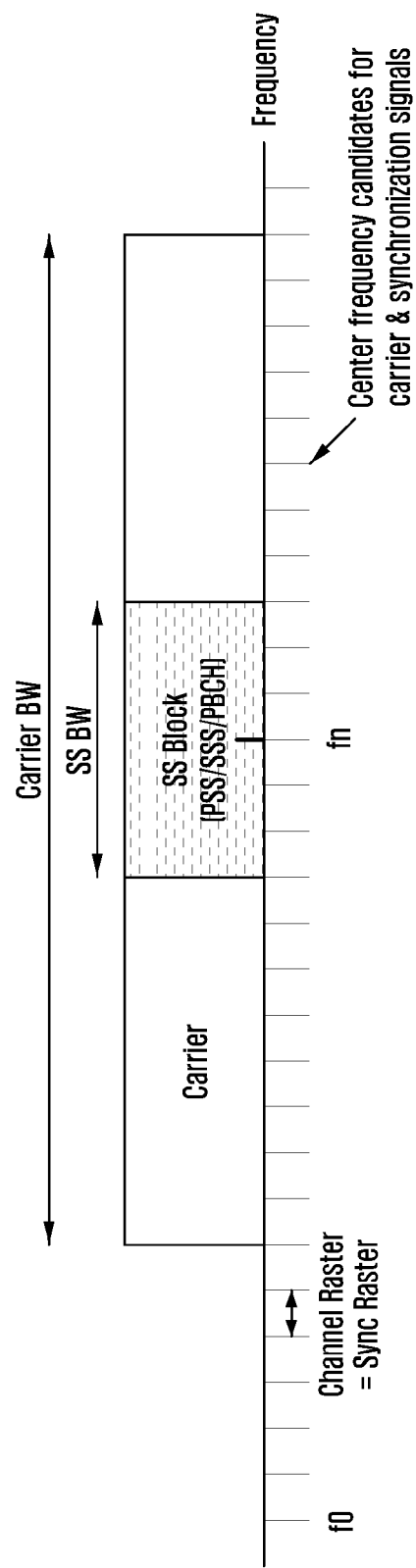

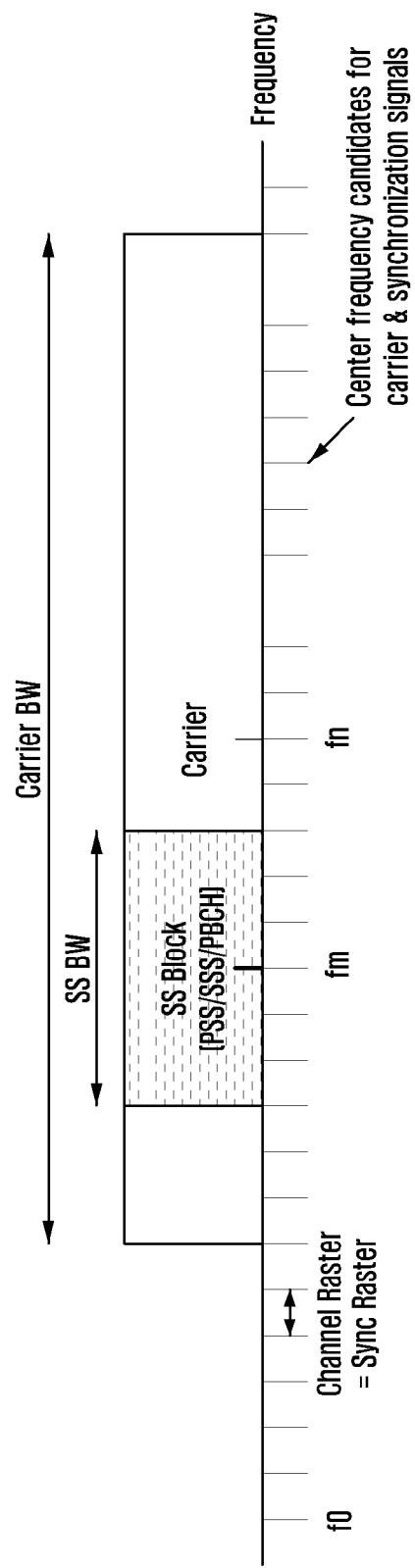
[Fig. 5]

[Fig. 6]
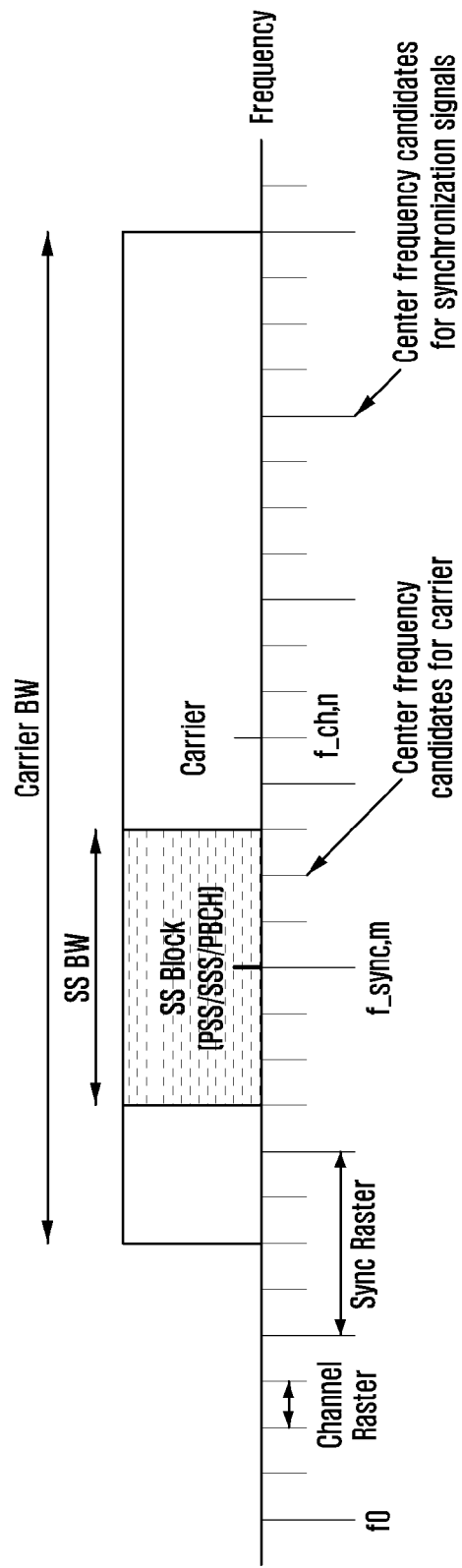

[Fig. 7]
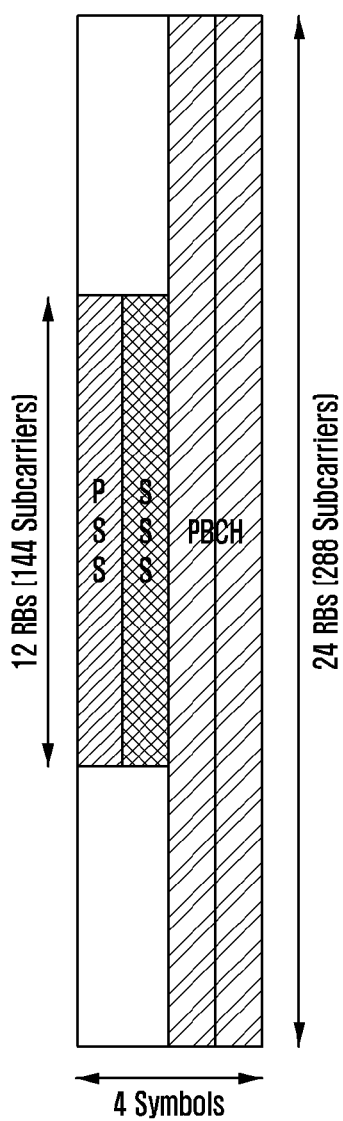

[Fig. 8]
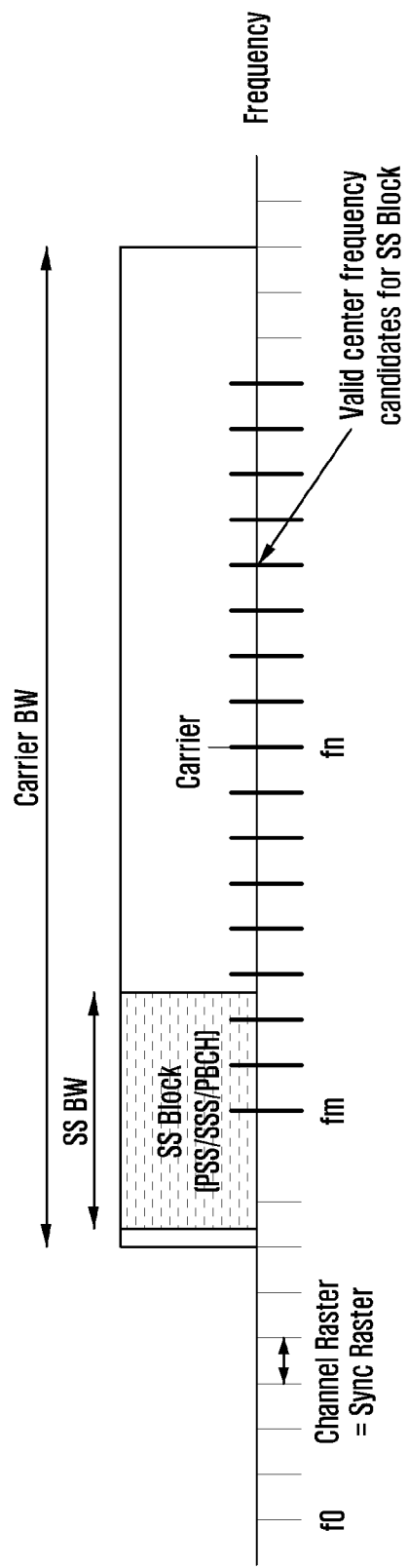

[Fig. 9]
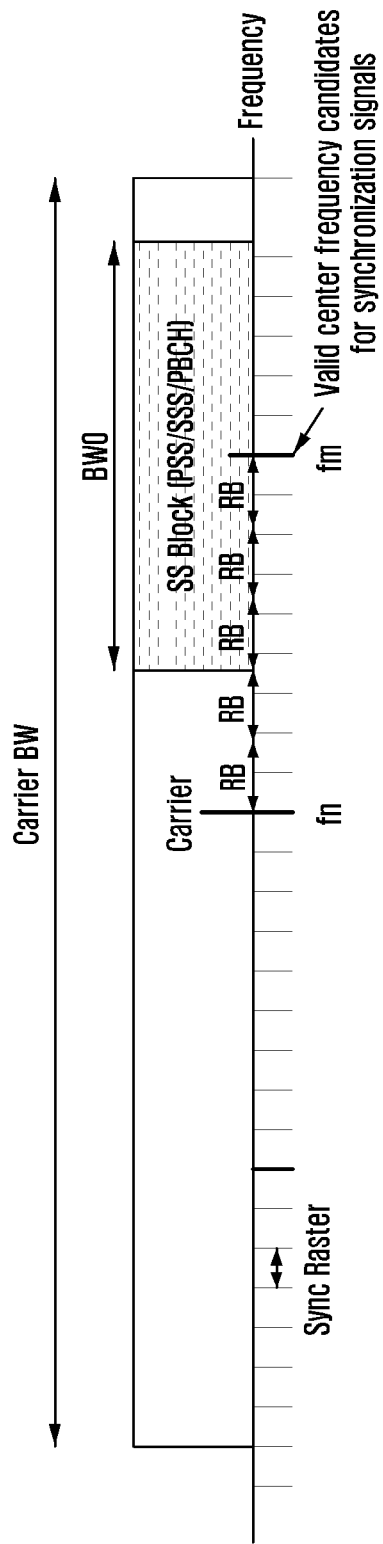

[Fig. 10]
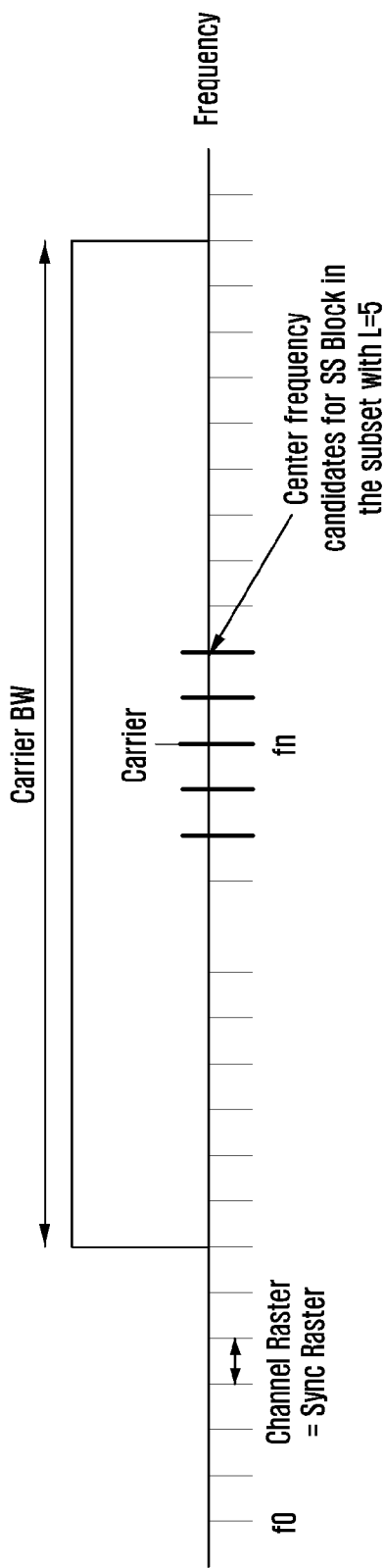

[Fig. 11]
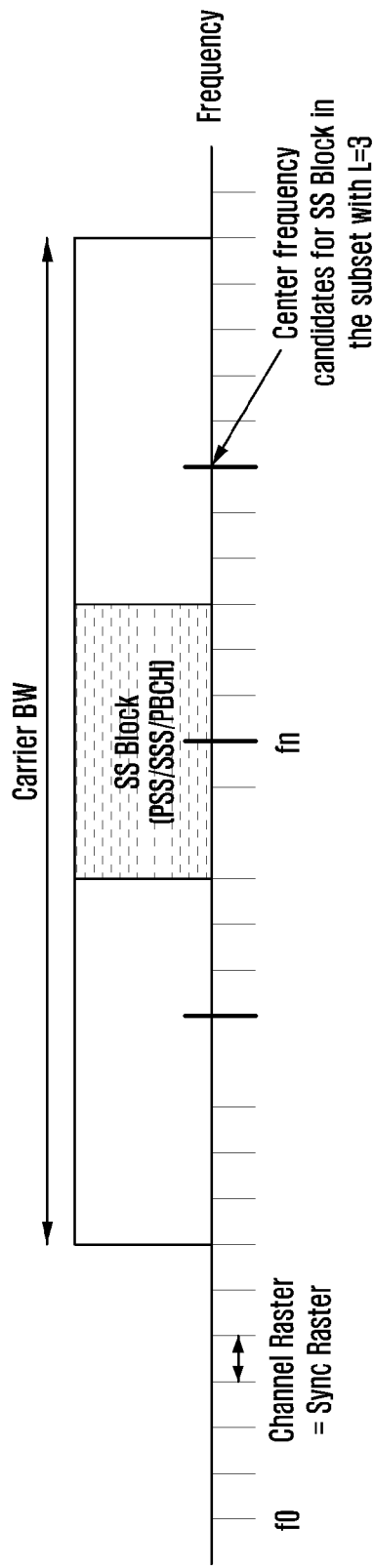

[Fig. 12]
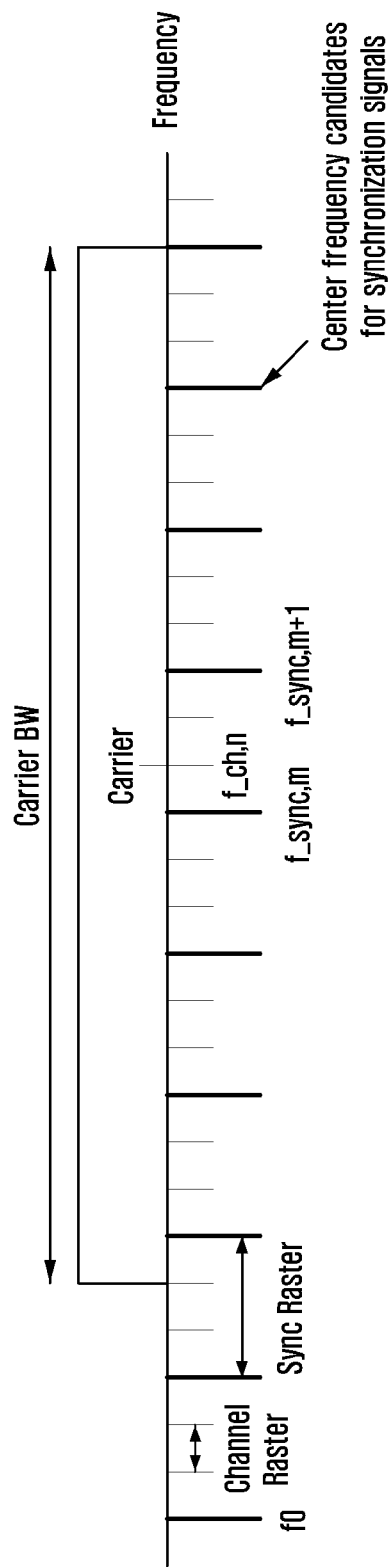

[Fig. 13]
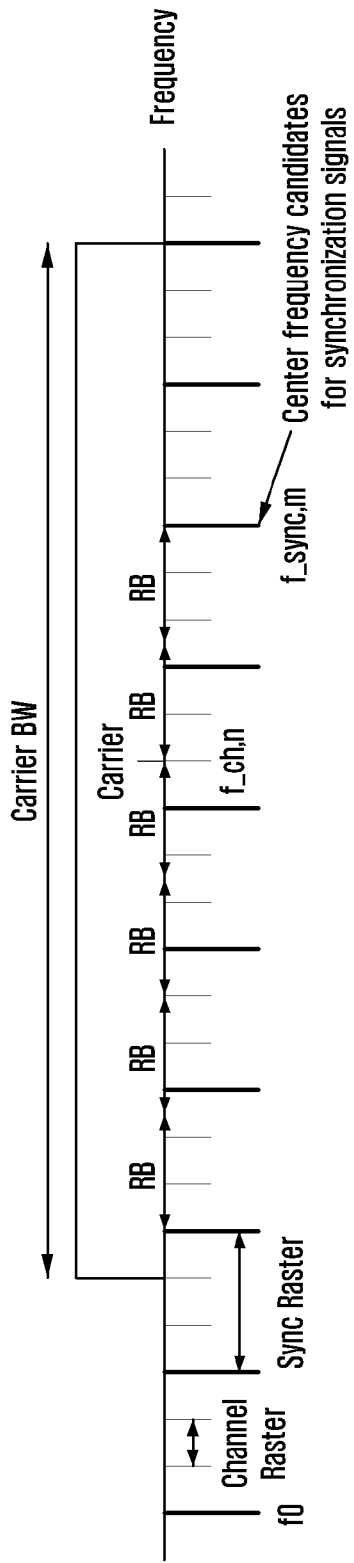

[Fig. 14a]
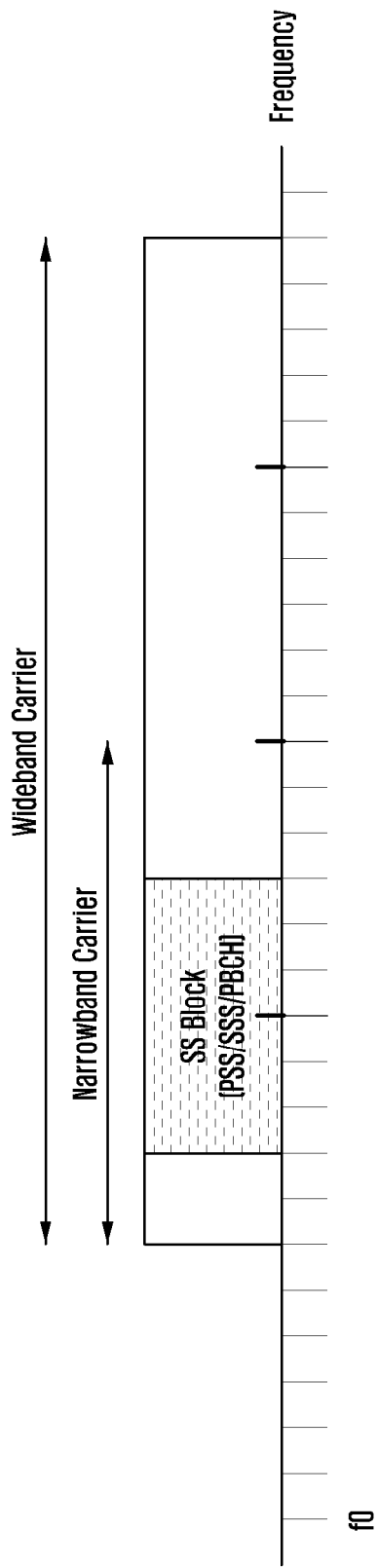

[Fig. 14b]
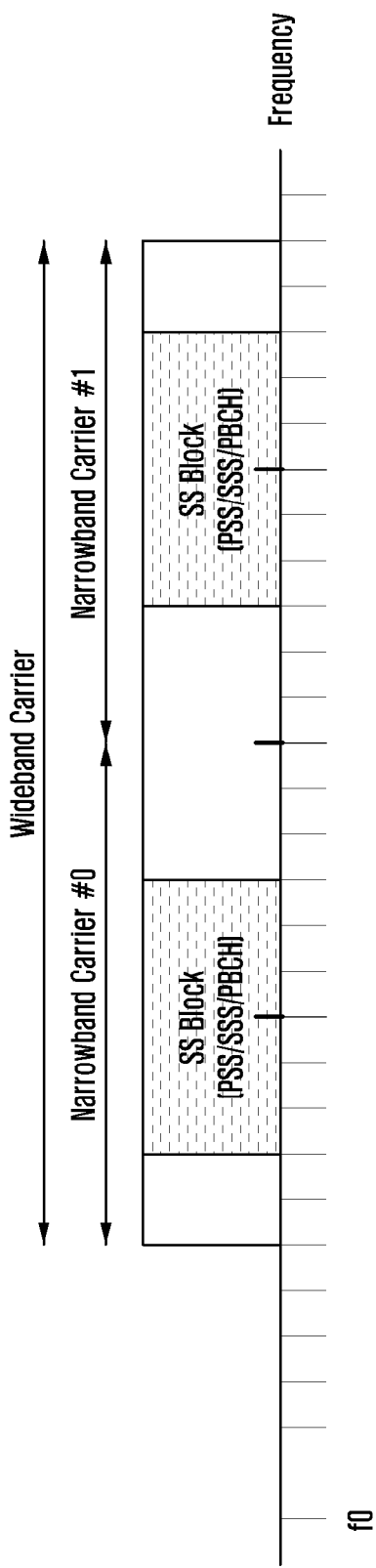

[Fig. 15]
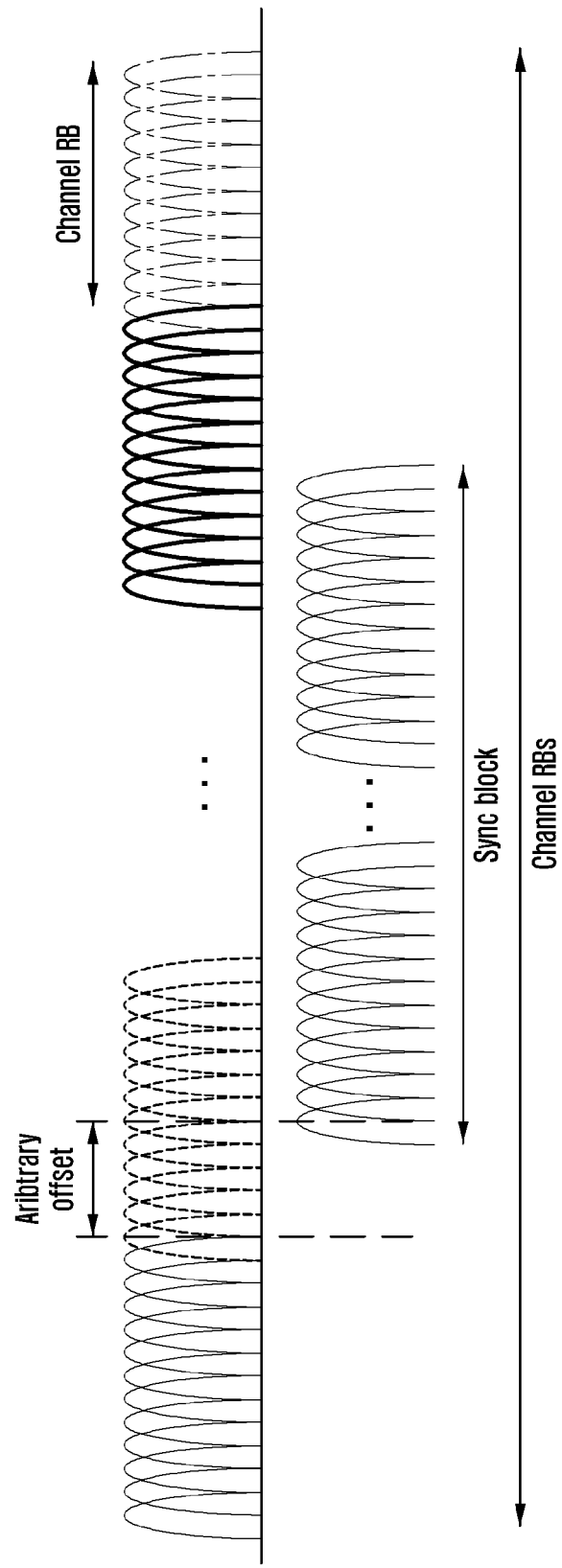

[Fig. 16]
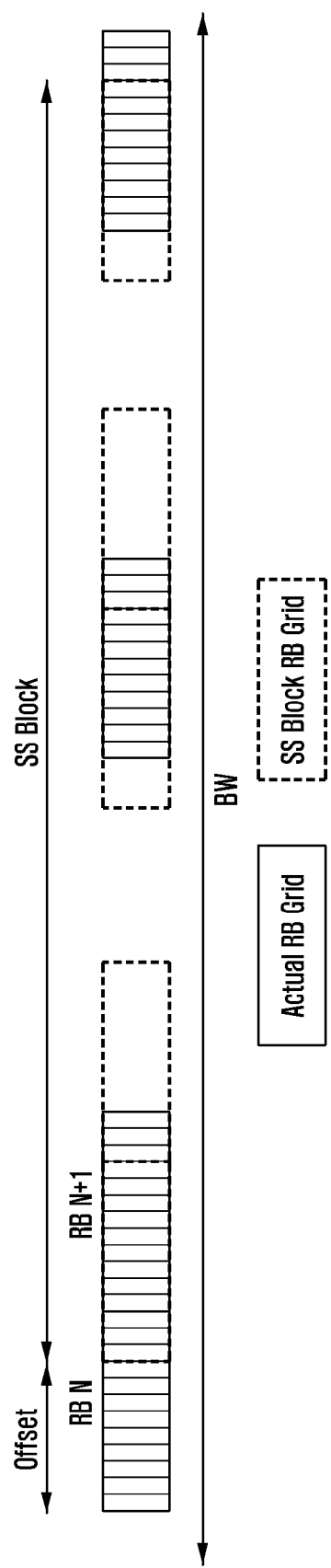

[Fig. 17]
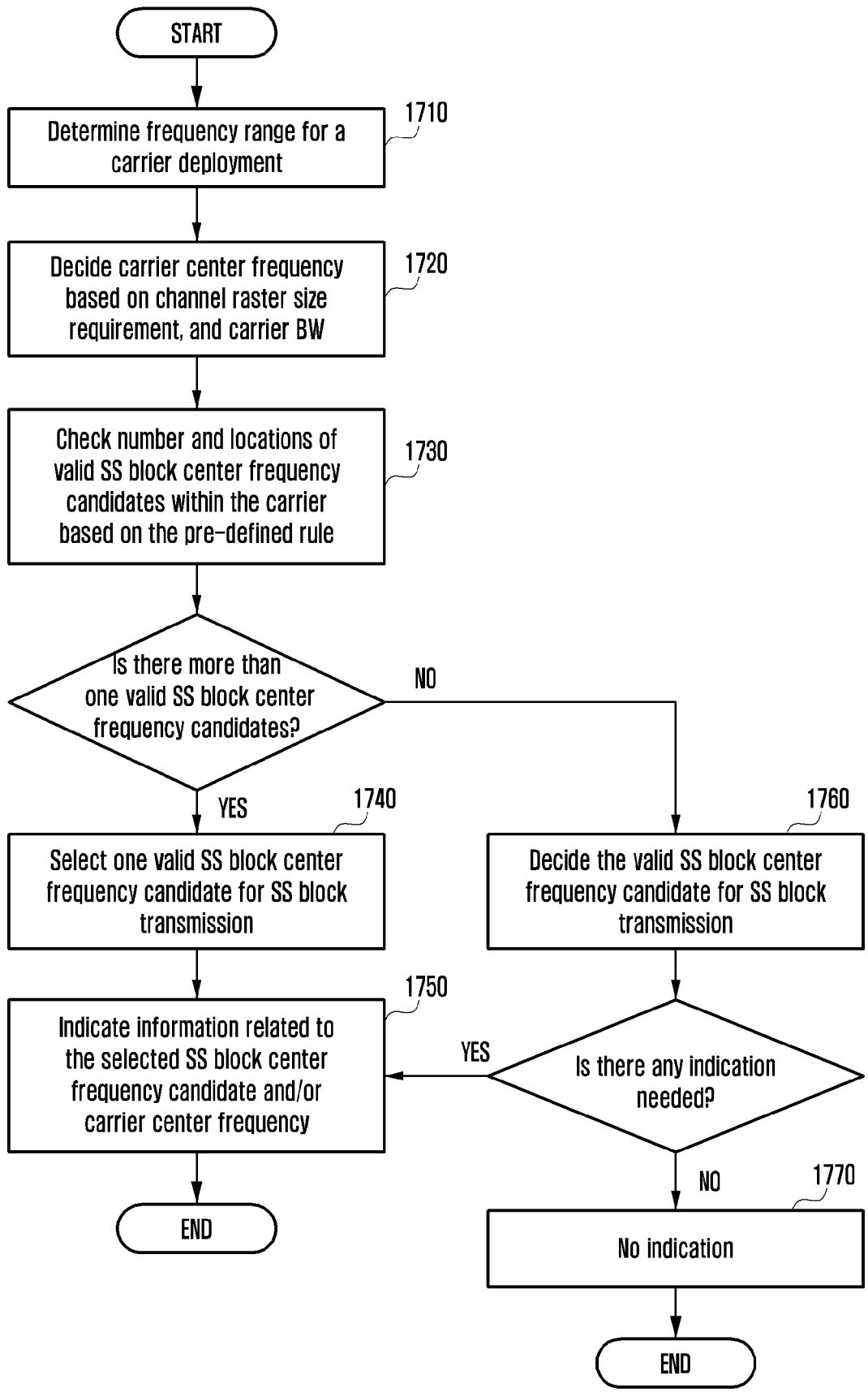

[Fig. 18]
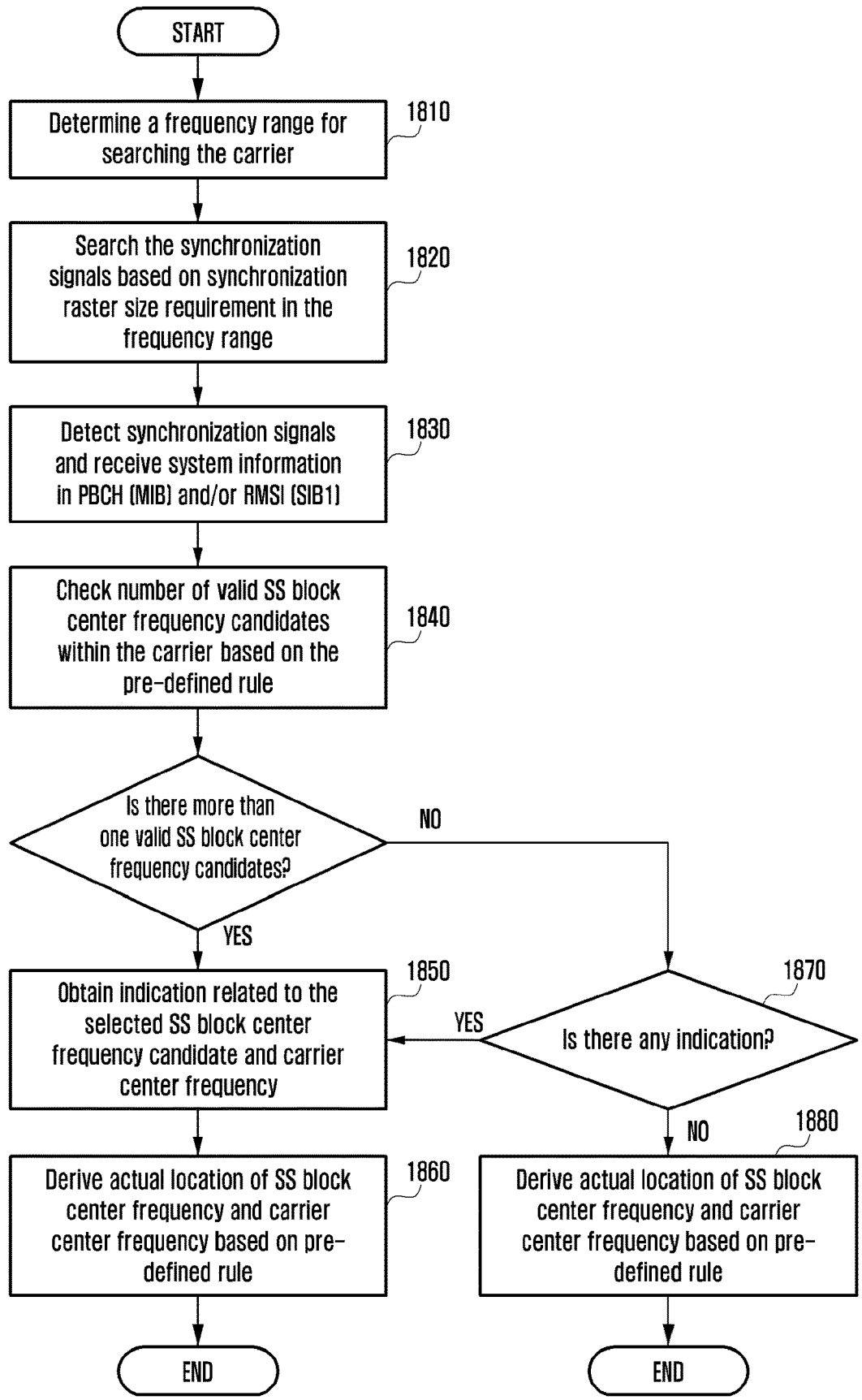

[Fig. 19]
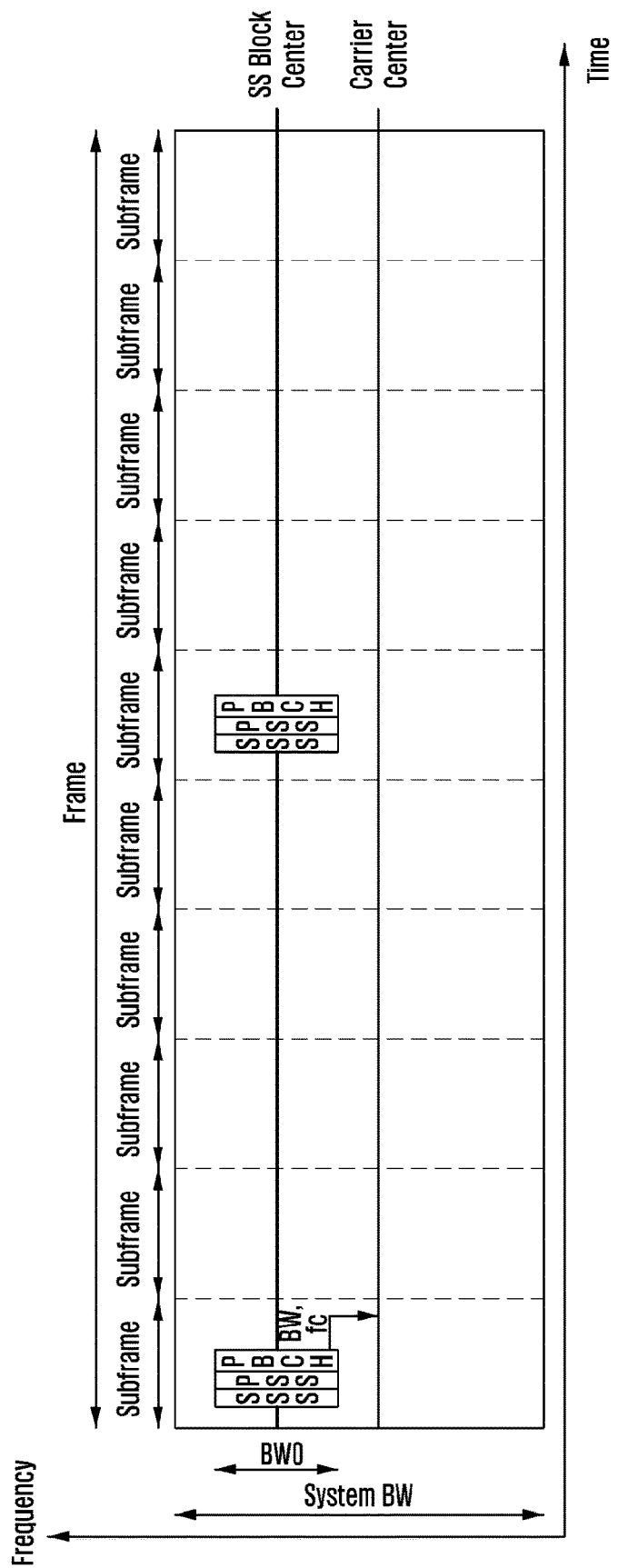

[Fig. 20]
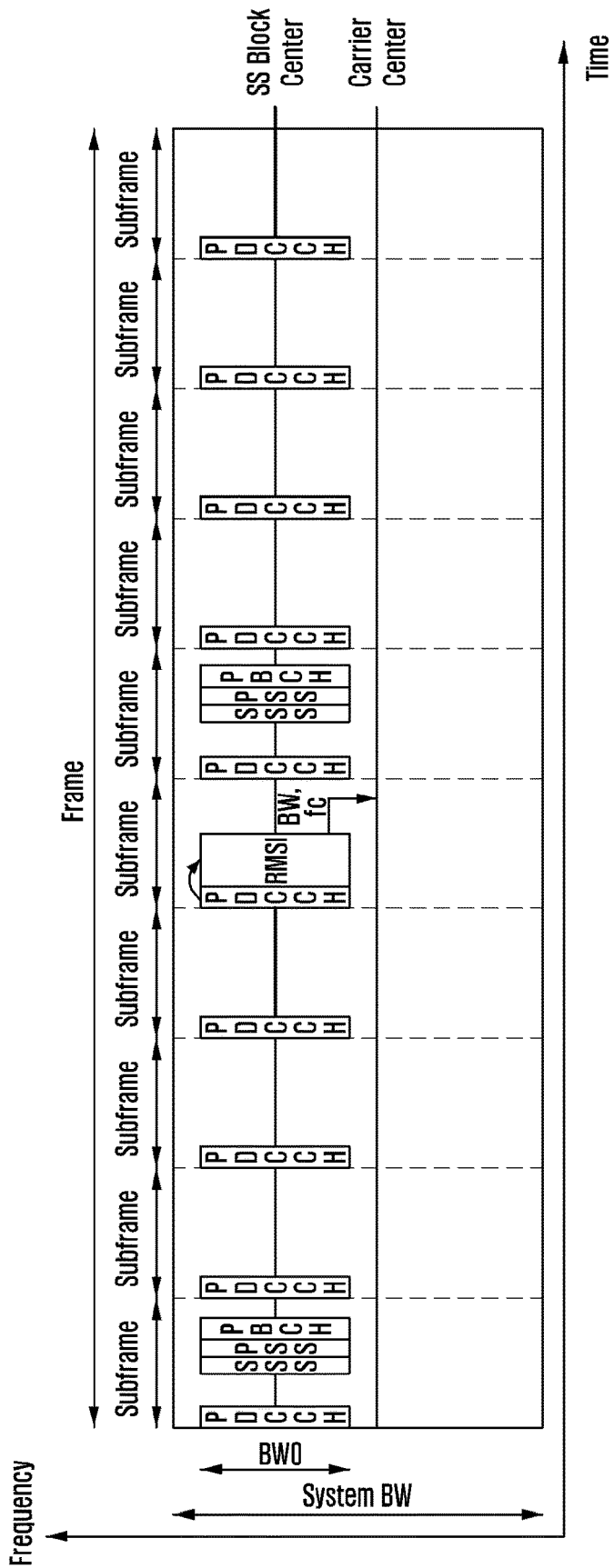

[Fig. 21]
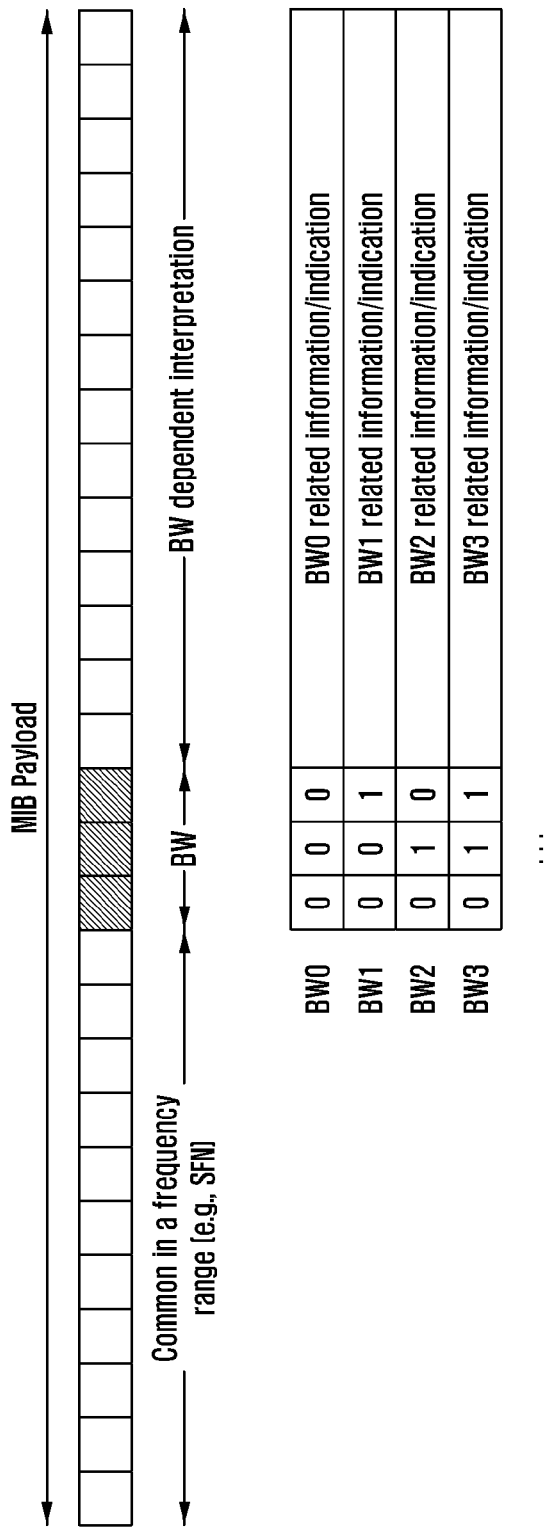

[Fig. 22a]
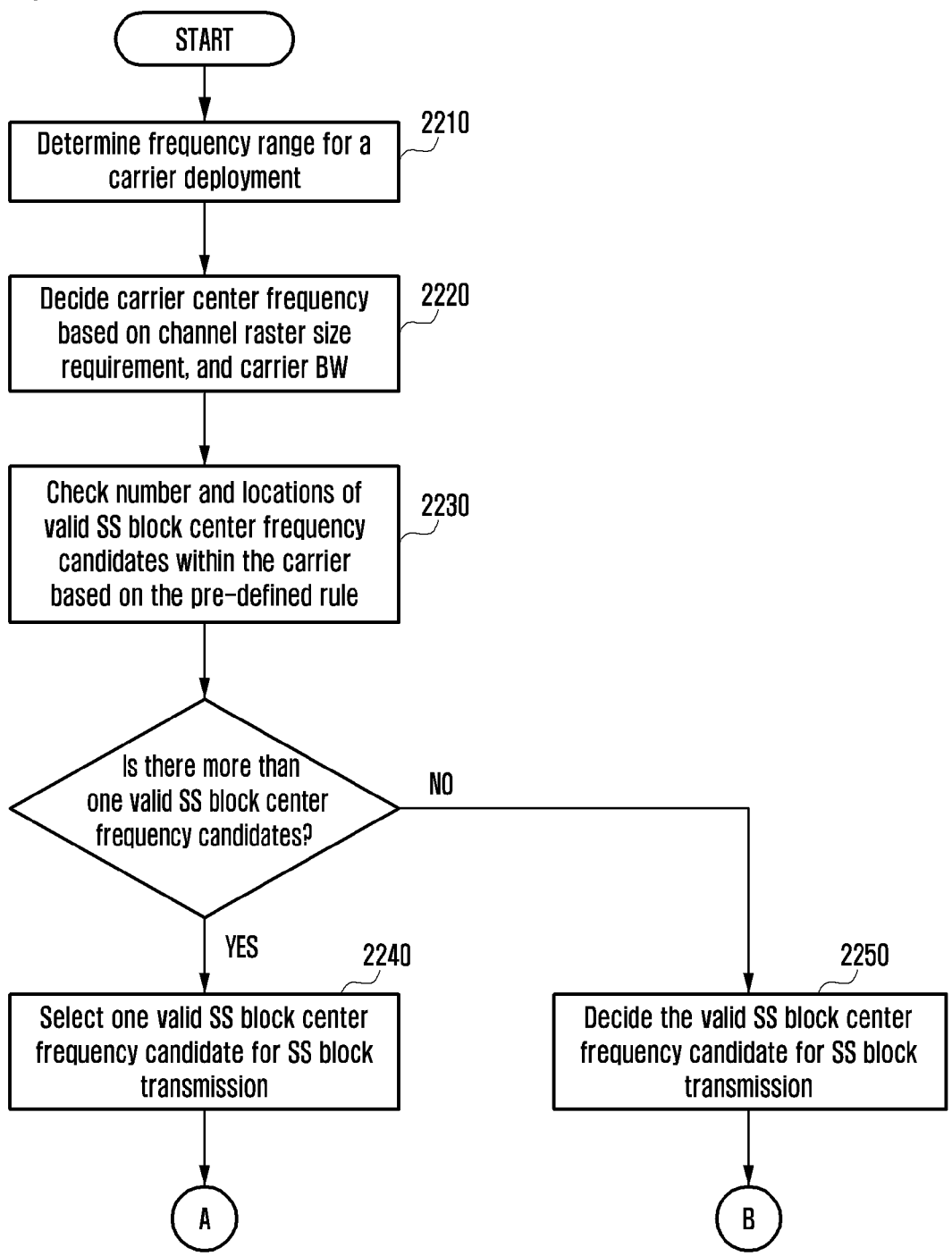

[Fig. 22b]
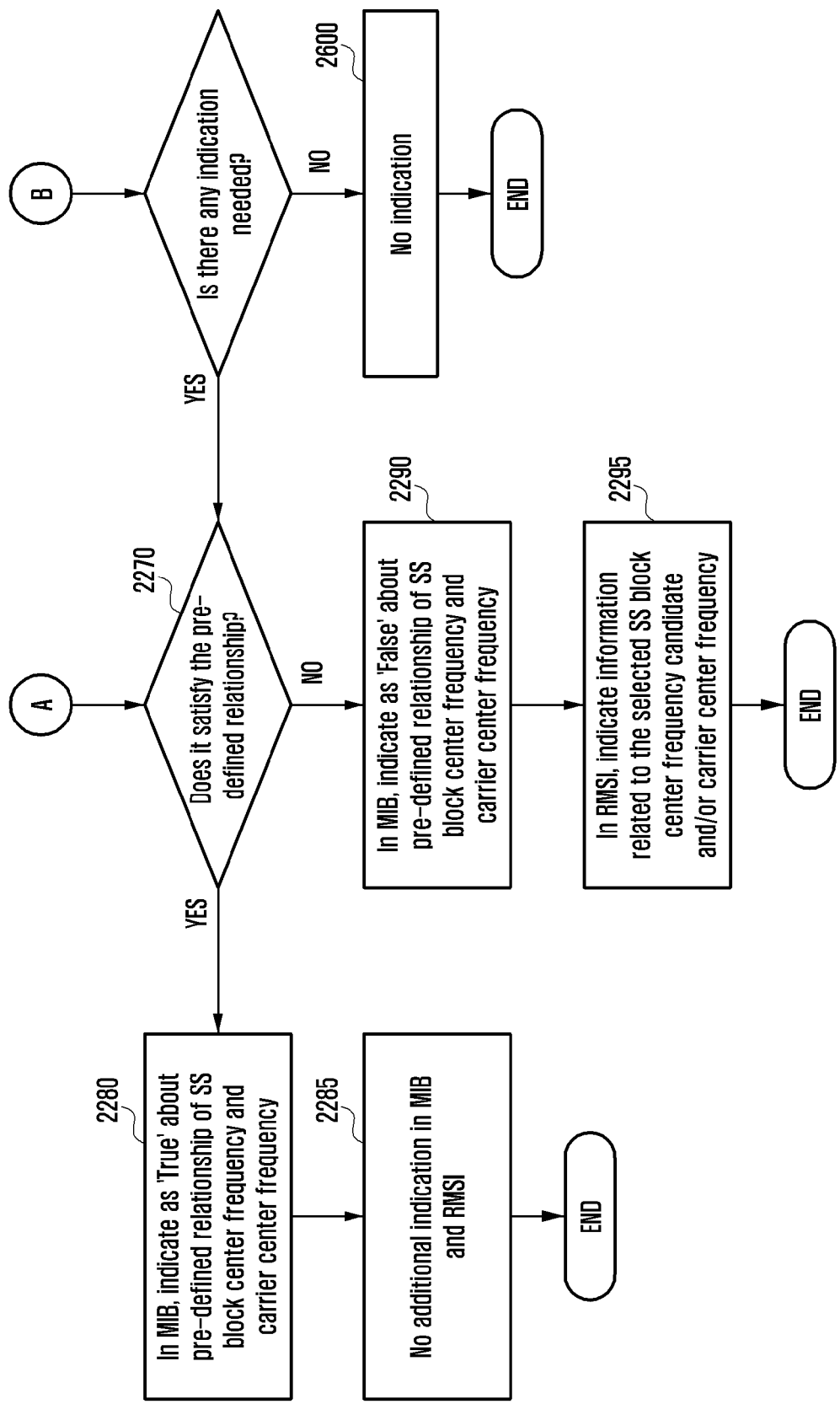

[Fig. 23]
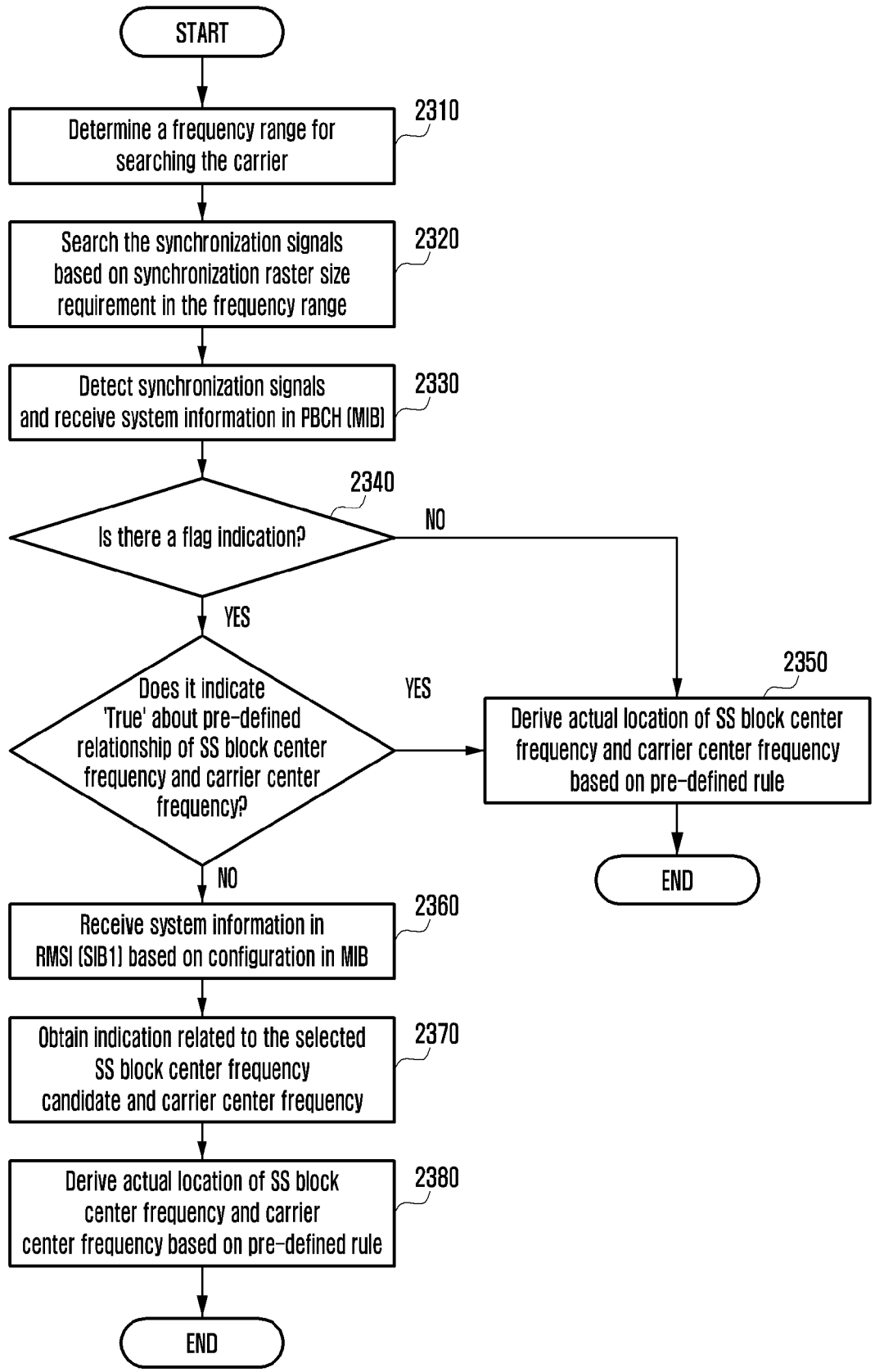

[Fig. 24]
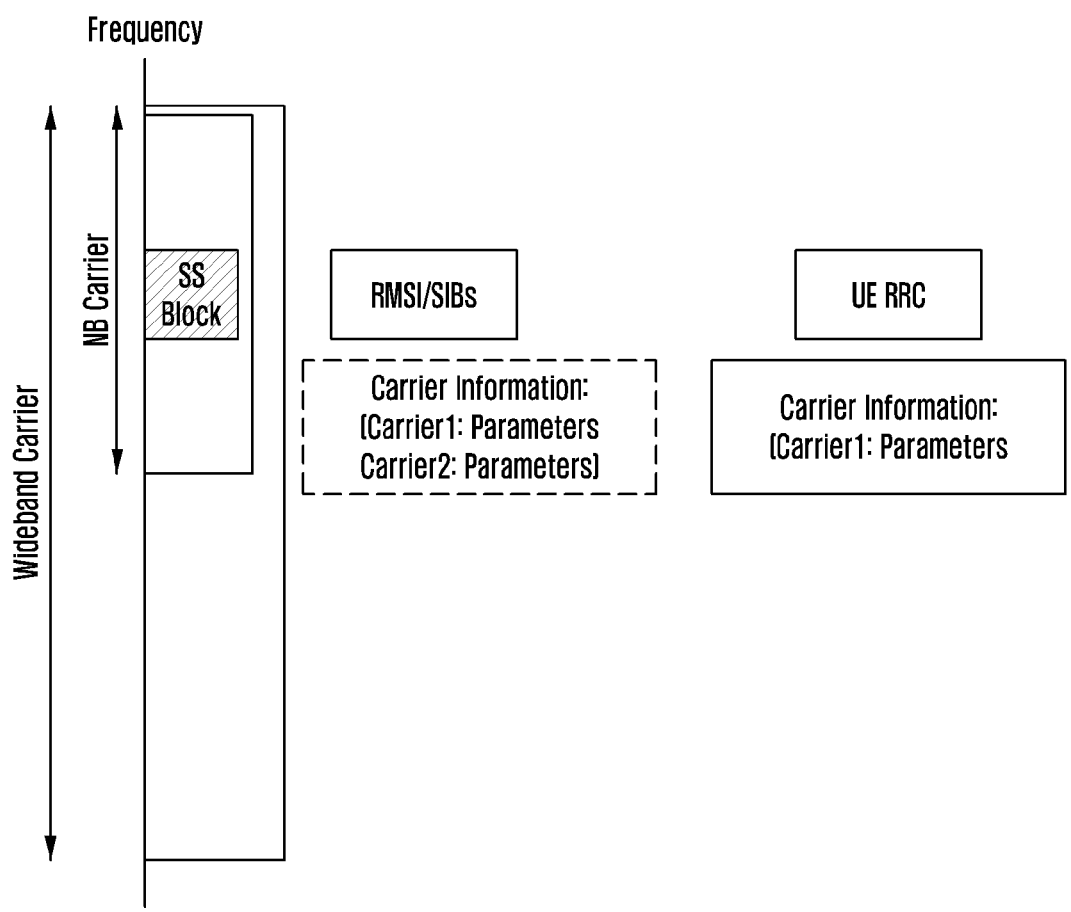

[Fig. 25]
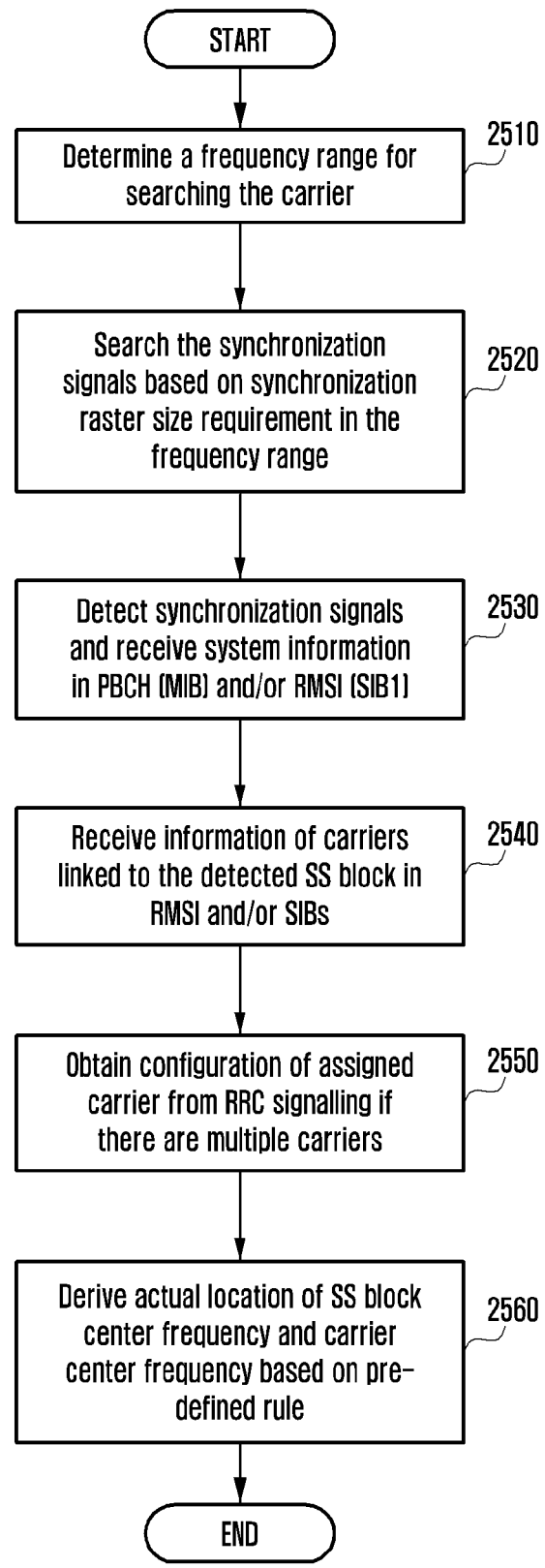

[Fig. 26]
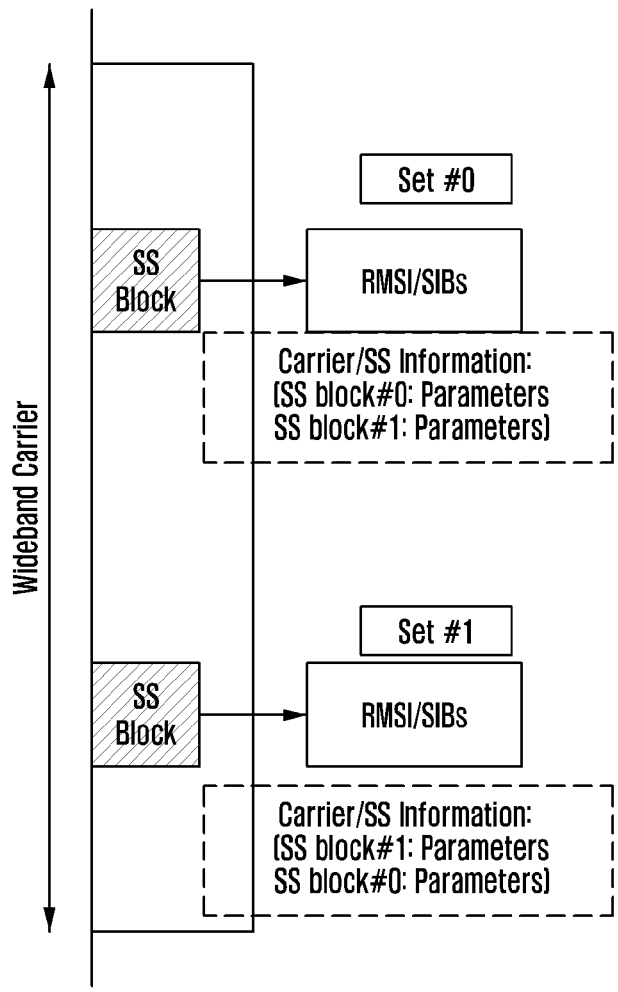

[Fig. 27]
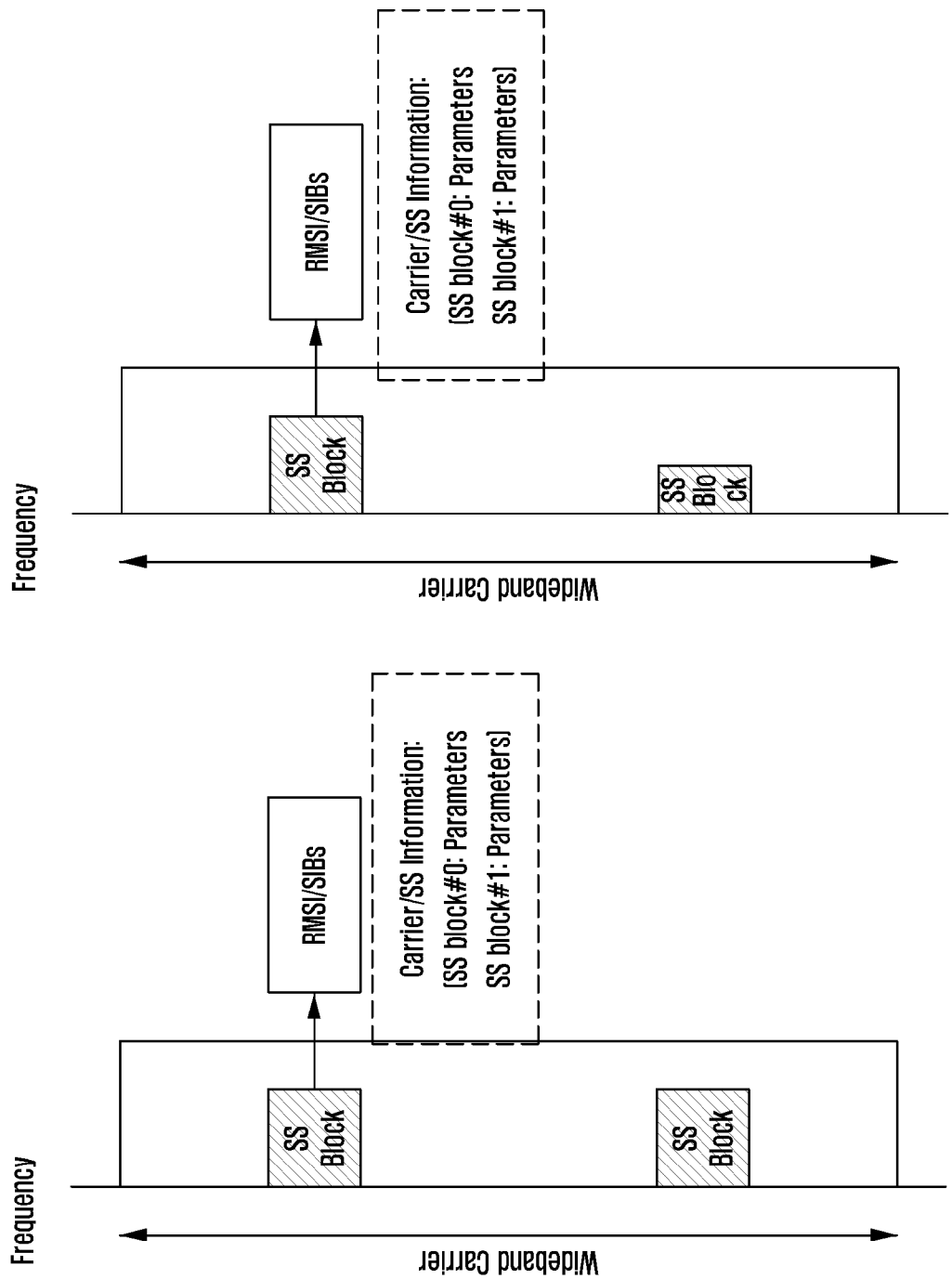

[Fig. 28]
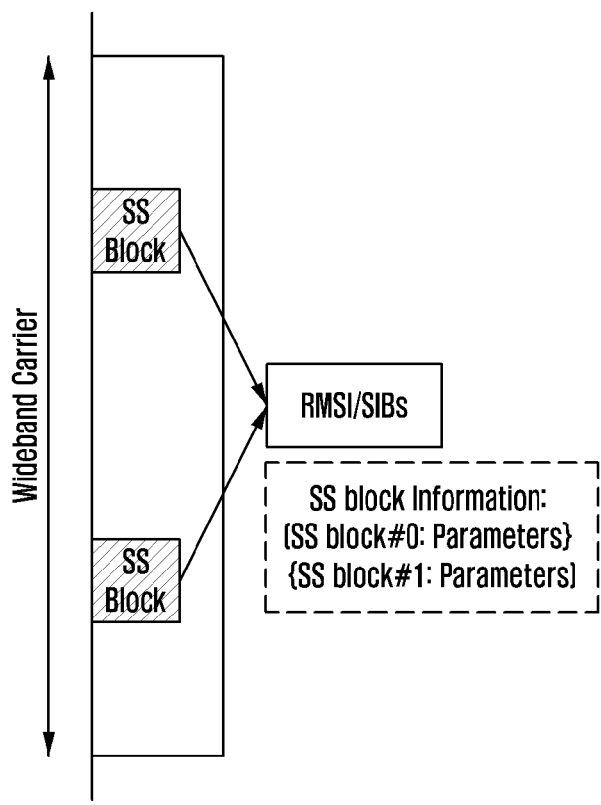

[Fig. 29]
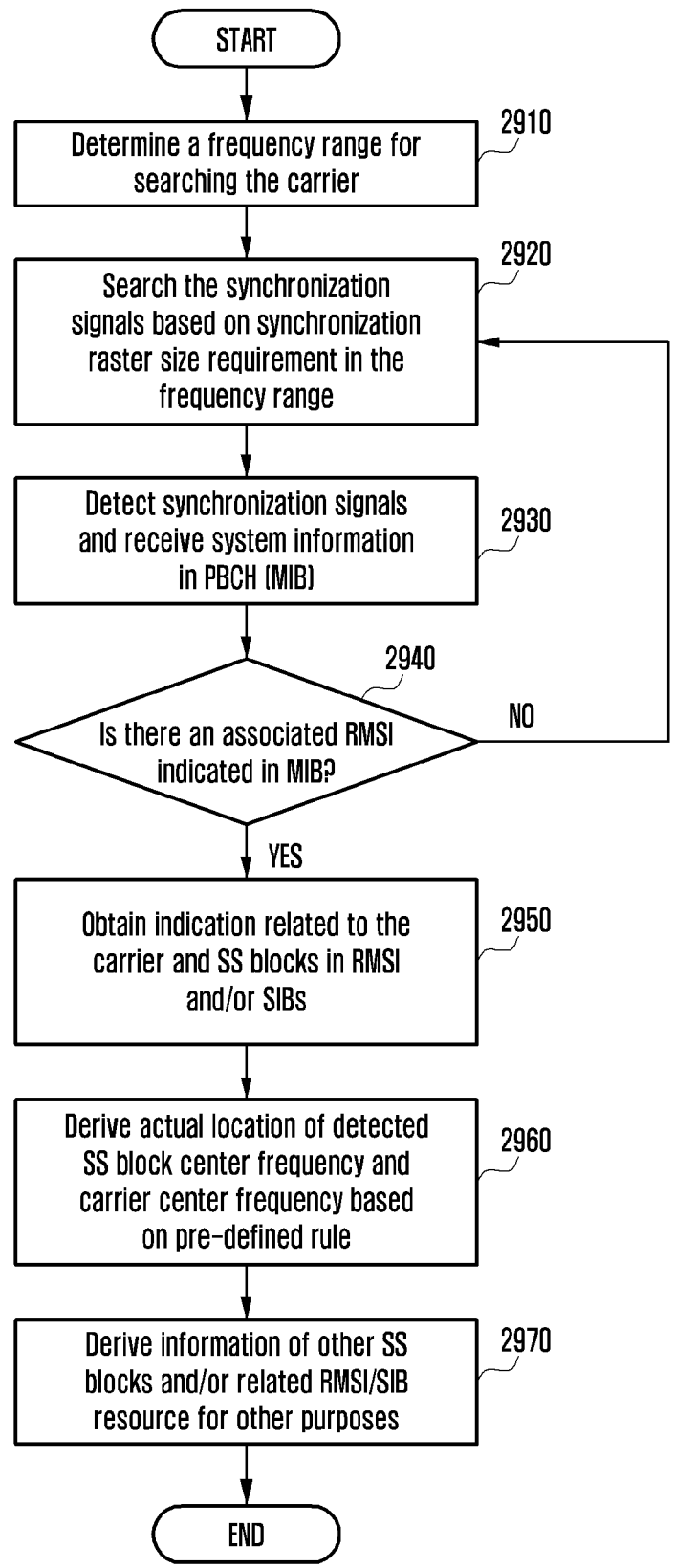

[Fig. 30]
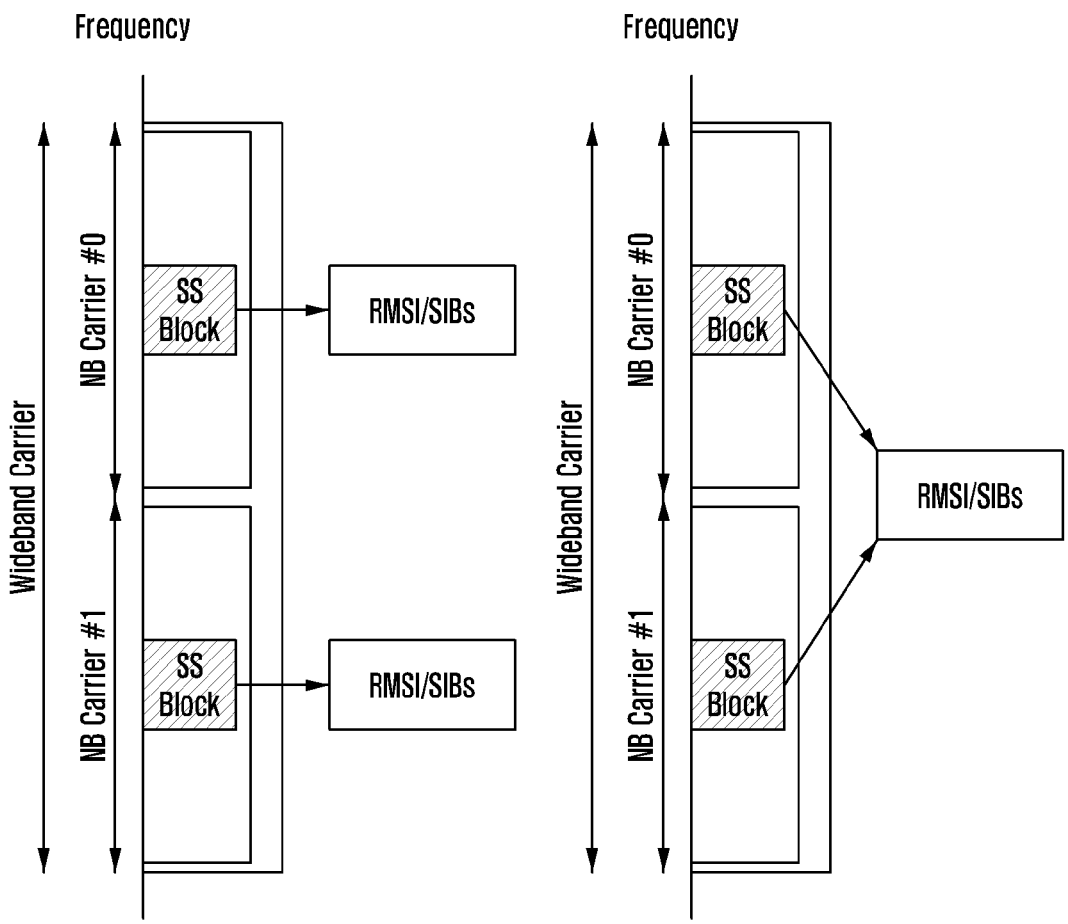

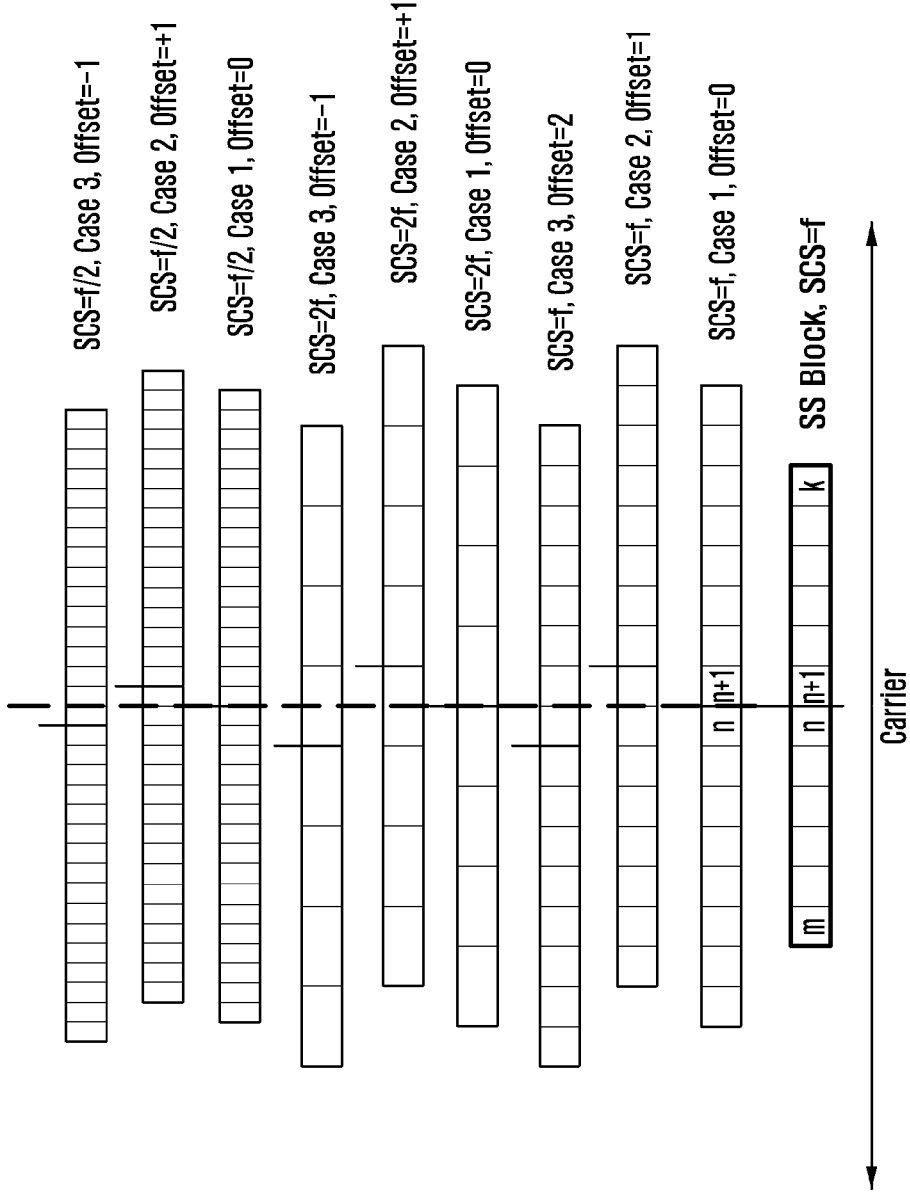
[Fig. 31a]

[Fig. 31b]
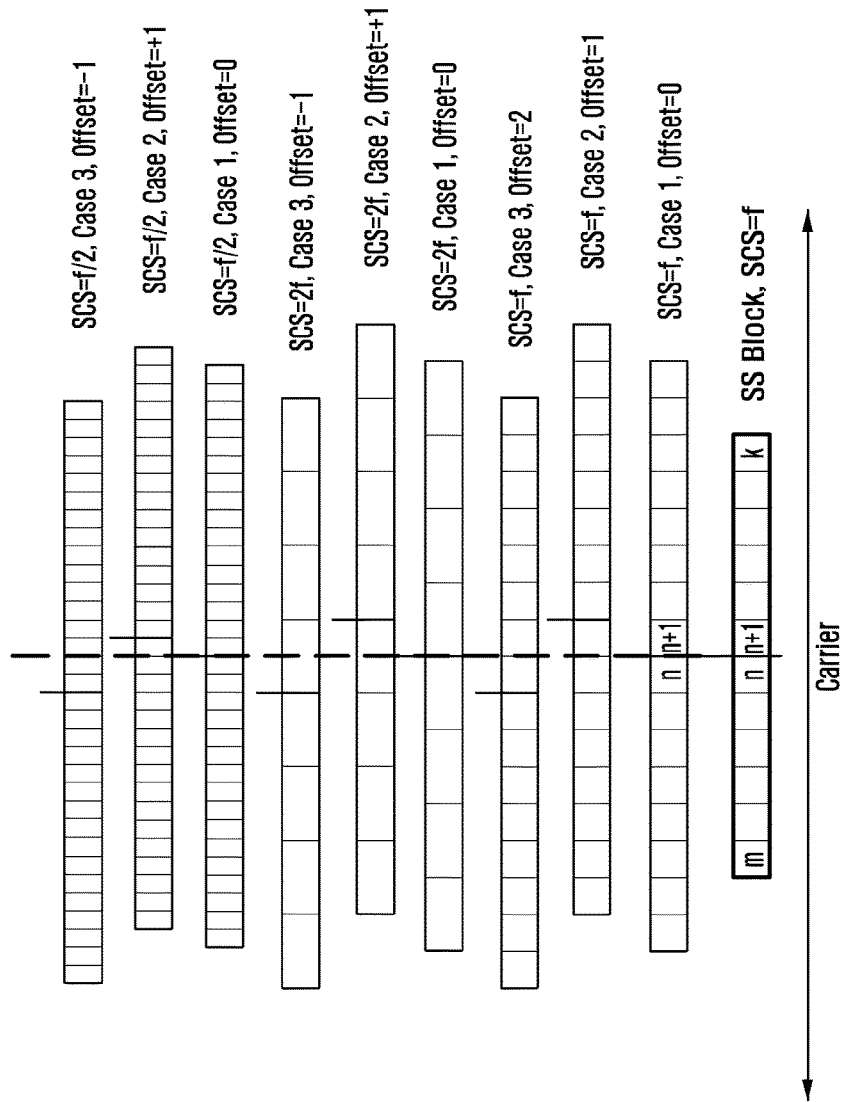
[Fig. 31c]
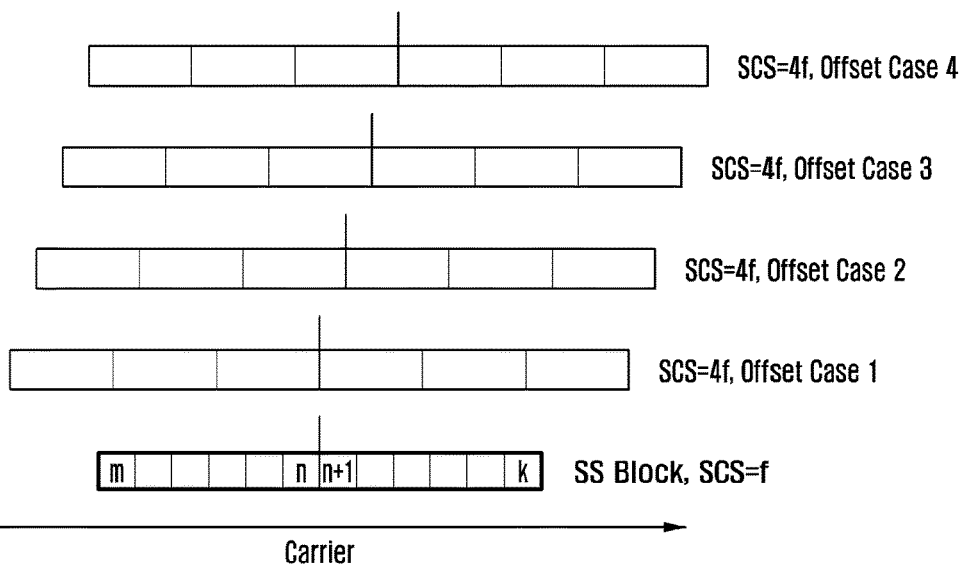

[Fig. 32]
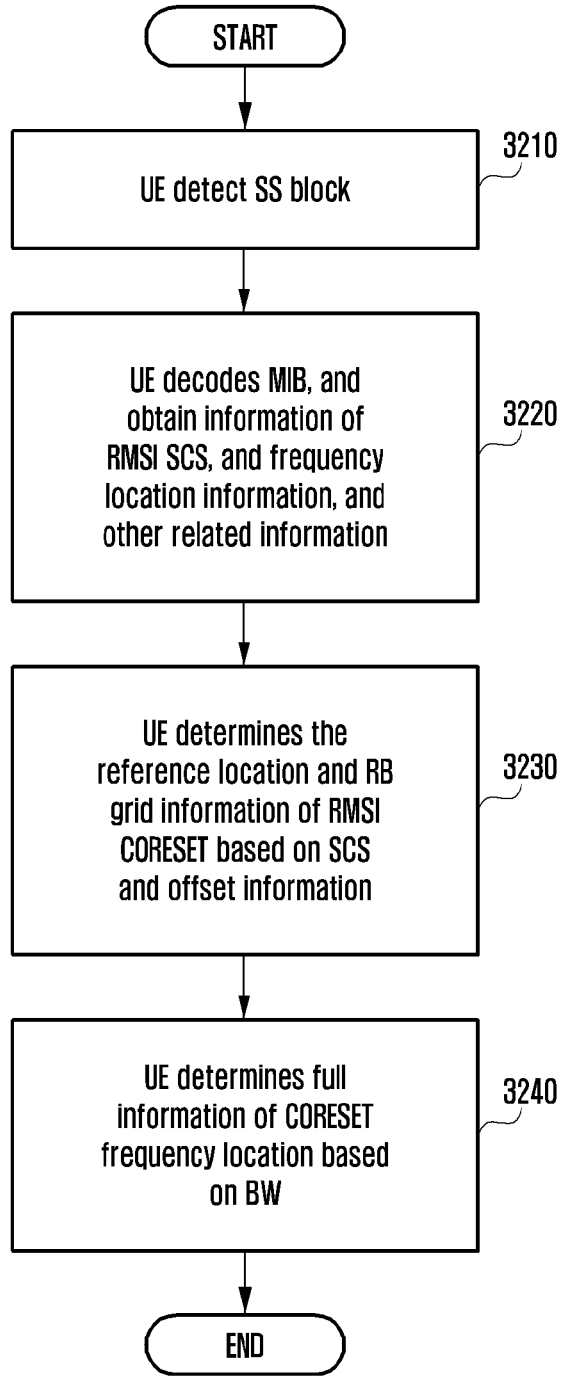

[Fig. 33]
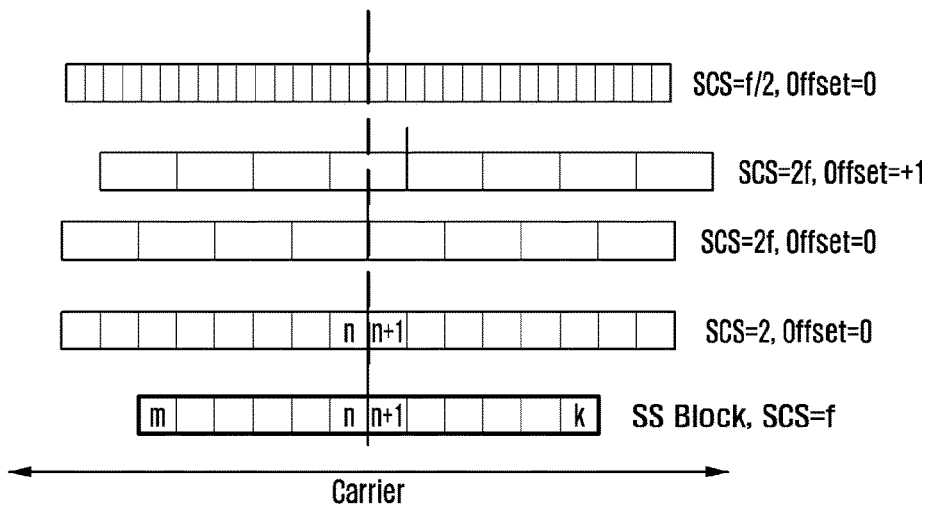
[Fig. 34]
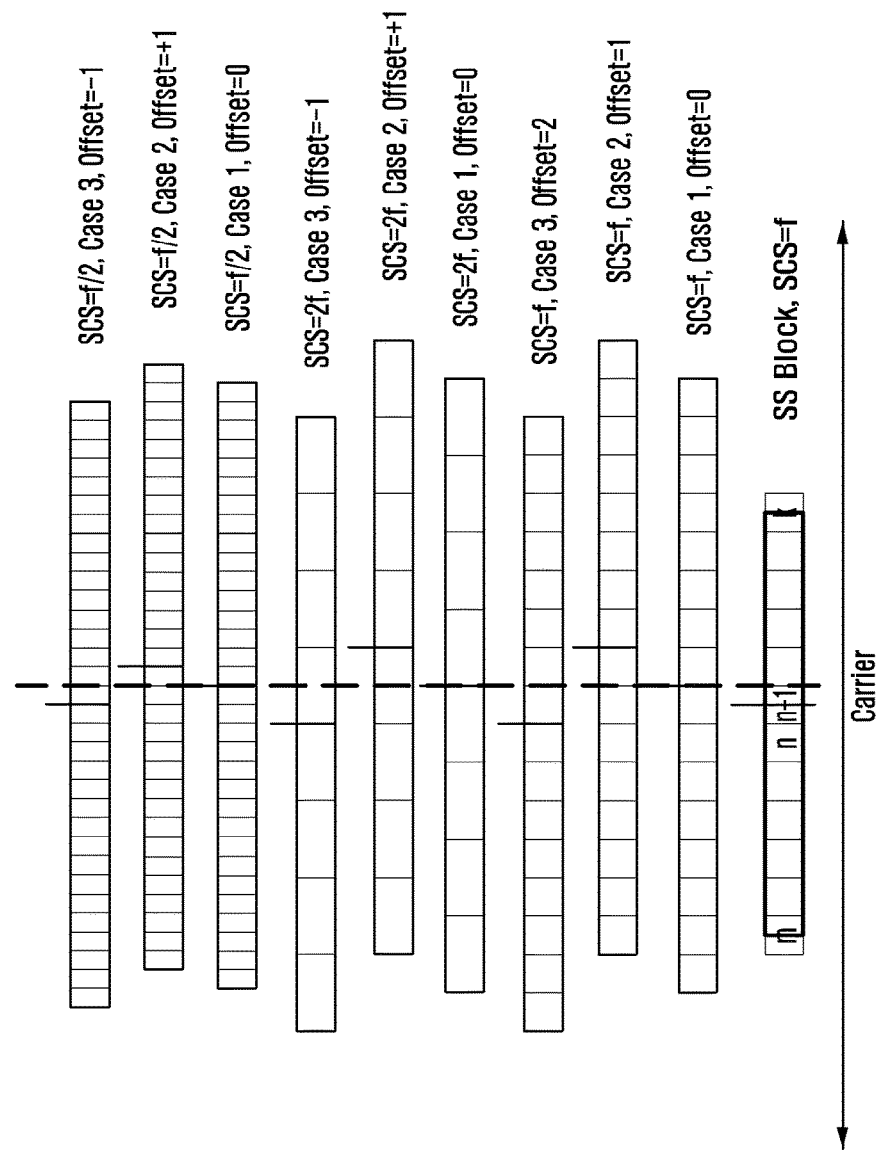

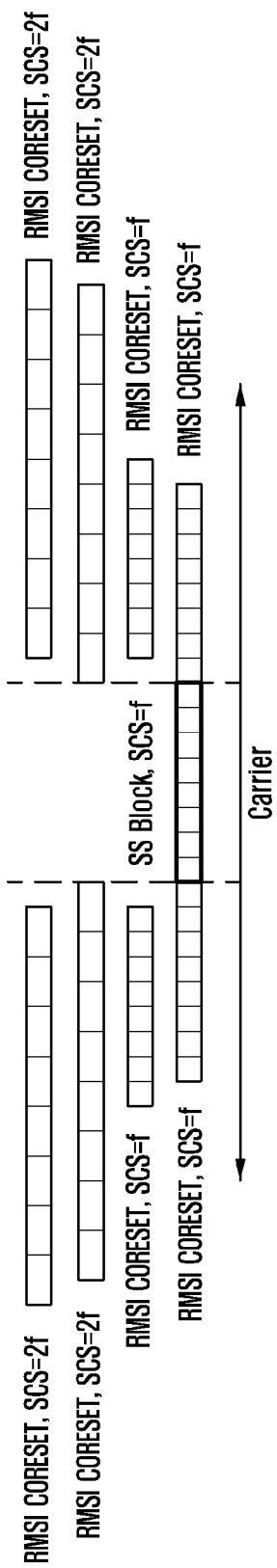
[Fig. 35]

[Fig. 36]
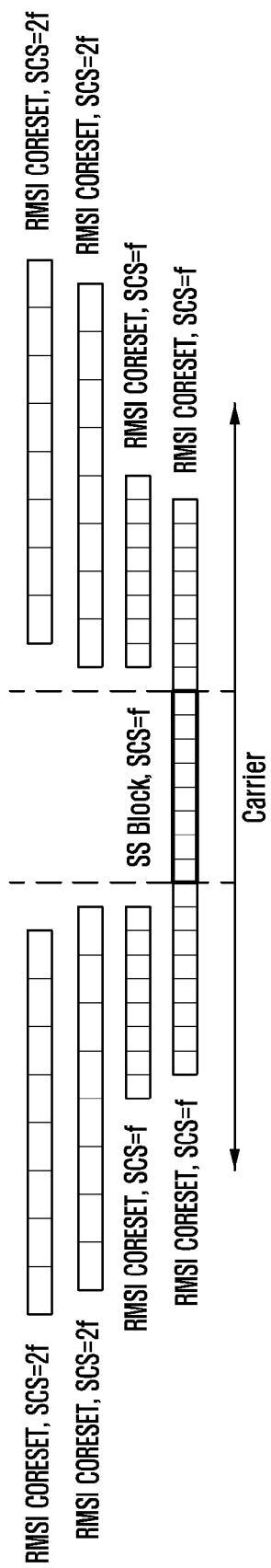

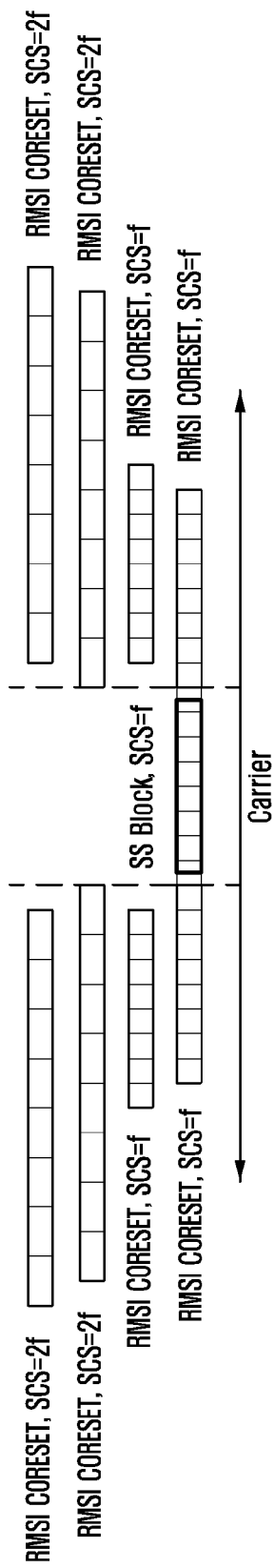
[Fig. 37]

[Fig. 38]
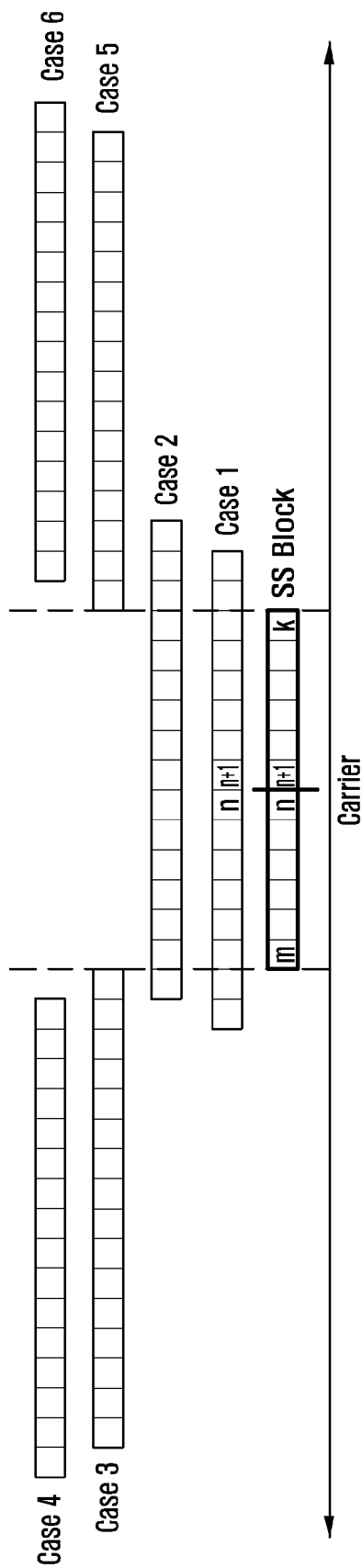

[Fig. 39]
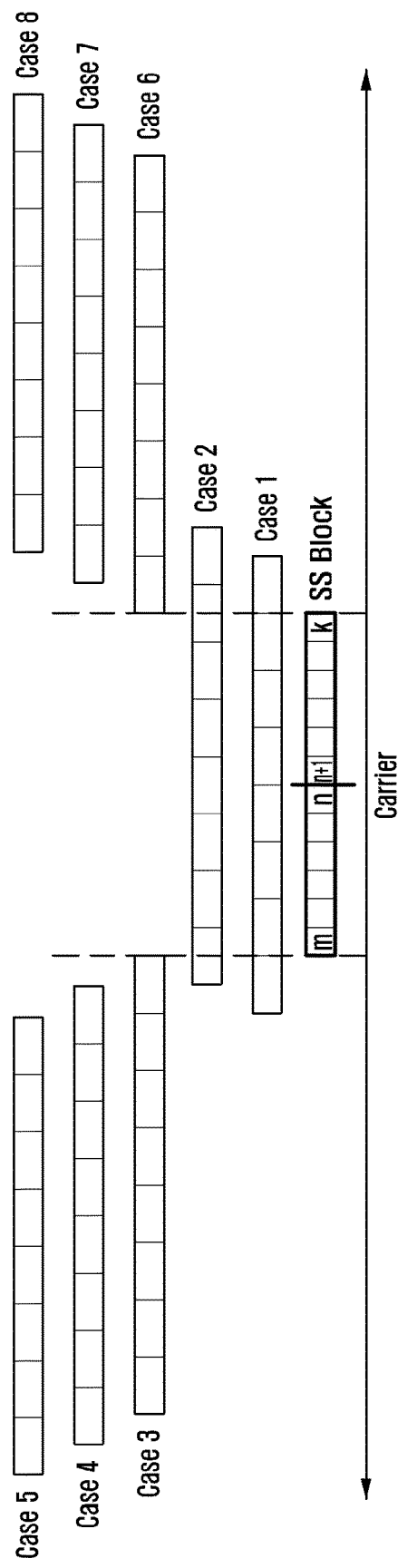

[Fig. 40]
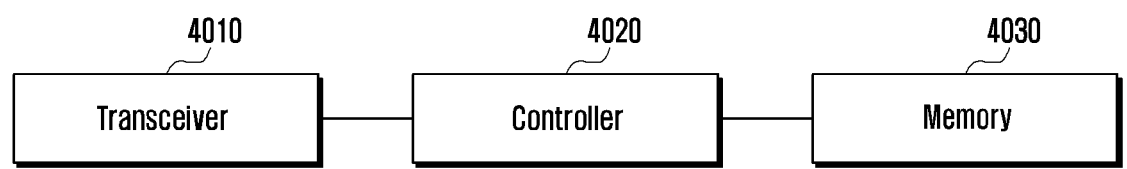
[Fig. 41]
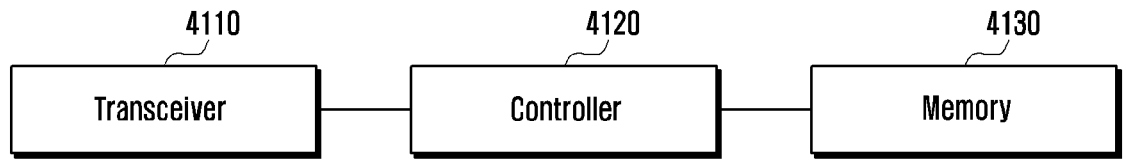

METHOD AND APPARATUS OF INITIAL ACCESS IN NEXT GENERATION CELLULAR NETWORKS

TECHNICAL FIELD

The disclosure relates to a method and an apparatus for receiving/transmitting data in a cellular network. More particularly, the disclosure relates an initial access in next generation cellular networks.

BACKGROUND ART

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'beyond 4G network' or a 'post long term evolution (LTE) System'. The 5G wireless communication system is considered to be implemented not only in lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive multiple-input multiple-output (MIMO), full dimensional MIMO (FD-MIMO), array antenna, an analog beam forming, and large scale antenna techniques are being considered in the design of the 5G wireless communication system. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multipoints (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

In the recent years several broadband wireless technologies have been developed to meet the growing number of broadband subscribers and to provide more and better applications and services. The second generation (2G) wireless communication system has been developed to provide voice services while ensuring the mobility of users. The third generation (3G) wireless communication system supports not only the voice service but also data service. The 4G wireless communication system has been developed to provide high-speed data service. However, the 4G wireless communication system suffers from lack of resources to meet the growing demand for high speed data services. Therefore, the 5G wireless communication system is being developed to meet the growing demand of various services with diverse requirements, e.g., high speed data services, ultra-reliability, low latency applications and massive machine type communication. Due to the widely supported services and various performance requirements, there is high potential that the user equipment (UE) may have different capabilities, e.g., in terms of supported UE bandwidth (BW). Flexible UE bandwidth support needs to be considered in the design of 5G network, and the flexible network access for UEs with different bandwidth capabilities.

In the 4G LTE networks, flexible system bandwidth is supported (e.g., 1.4 MHz/3 MHz/5 MHz/10 MHz/15 MHz/20 MHz), and the channel designs are mostly based on the operated system bandwidth. This gives mandatory requirement that the UE should operate in the same bandwidth with the system, except in initial access when UE has no information of the system bandwidth. Since the UEs have no information of the system bandwidth in the initial access, the essential signals and channels are transmitted based on a pre-defined bandwidth, e.g., the minimum bandwidth supported by the networks.

FIG. 1 illustrates system operation in LTE.

As shown in FIG. 1, the transmission of the synchronization signals (e.g., primary synchronization signal (PSS) and secondary synchronization signal (SSS)) and broadcast channel (e.g., physical broadcast channel (PBCH)) is fixed in the center of the system bandwidth and limited within a pre-defined bandwidth, which is accessible to all UEs. After receiving the PBCH, it is possible that the UEs obtain the system bandwidth, which is indicated in the master information block (MIB) carried by PBCH. The transmissions of other channels/signals occupy the full system bandwidth, because the UEs can access the actual system bandwidth after obtaining the system bandwidth information.

FIG. 2 shows a flowchart of UE performing initial access.

Referring to FIG. 2, UE searches PSS/SSS at operation 210. If UE detects PSS/SSS, UE derives a center frequency of the system bandwidth and obtains symbol/slot/frame boundary based on the PSS/SSS at operation 220. Based on the information derived and obtained at operation 220, UE receives PBCH and decode MIB at operation 230. UE obtains information on system frame number (SFN), system bandwidth, etc. from the decoded MIB at operation 240. UE searches PDCCH in full system bandwidth to receive system information at operation 250.

Meanwhile, for the UEs with less bandwidth than the system bandwidth, it is impossible for the UEs to access the channel which occupies full system bandwidth. There is limitation of the current systems to support flexible access for UEs with various bandwidths.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G) system.

Additional aspects will be set forth in part in the description which follows and, in part, will be apparent from the description, or may be learned by practice of the presented embodiments.

The disclosure provides a method and an apparatus for receiving/transmitting data in a cellular network.

The disclosure provides a method and an apparatus for an initial access in next generation cellular networks.

The disclosure provides a method and an apparatus for supporting flexible access for terminals with various bandwidths.

Solution to Problem

In accordance with a first aspect of the disclosure, a method of a terminal for receiving data in a cellular network is provided. The method includes receiving a synchronization signal block (SS block) including at least one synchronization signal and a broadcast channel from a base station, identifying an offset between the SS block and a resource block (RB) grid from system information in the broadcast channel, and determining the RB grid based on the offset.

In accordance with a second aspect of the disclosure, a method of a base station for transmitting data in a cellular network is provided. The method includes determining a resource block (RB) grid and a location of a synchronization signal block (SS block) including at least one synchronization signal and a broadcast channel and transmitting the SS block based on the RB grid to a terminal. An offset between the SS block and the RB grid is transmitted in system information through the broadcast channel.

In accordance with a third aspect of the disclosure, a terminal for receiving data in a cellular network is provided. The terminal includes a transceiver and a controller coupled with the transceiver. The transceiver is configured to receive signals from a base station and to transmit signals to the base station. The controller is configured to control the transceiver to receive a synchronization signal block (SS block) including at least one synchronization signal and a broadcast channel from the base station, identify an offset between the SS block and a resource block (RB) grid from system information in the broadcast channel, and determine the RB grid based on the offset.

In accordance with a fourth aspect of the disclosure, a base station for transmitting data in a cellular network is provided. The base station includes a transceiver and a controller coupled with the transceiver is provided. The transceiver is configured to receive signals from a terminal and to transmit signals to the terminal. The controller is configured to determine a resource block (RB) grid and a location of a synchronization signal block (SS block) including at least one synchronization signal and a broadcast channel, control the transceiver to transmit the SS block based on the RB grid to the terminal, and control the transceiver to transmit an offset between the SS block and the RB grid in system information through the broadcast channel to the terminal.

Advantageous Effects of Invention

Flexible access for terminals may be supported with various bandwidths.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 1 illustrates system operation in Long Term Evolution (LTE);

FIG. 2 shows a flowchart of user equipment (UE) performing initial access;

FIG. 3 shows an example of resource grid structure of an orthogonal frequency division multiplexing (OFDM) based communication system;

FIG. 4 shows an example of same size of channel raster and synchronization raster;

FIG. 5 shows another example of same size of channel raster and synchronization raster;

FIG. 6 shows an example of different size of channel raster and synchronization raster;

FIG. 7 shows an example of SS Block including primary synchronization signal (PSS), secondary synchronization signal (SSS)) and physical broadcast channel (PBCH);

FIG. 8 shows an example of valid candidate for synchronization signal block (SS block) center frequency;

FIG. 9 shows another example of valid candidate center frequency for the SS block;

FIG. 10 shows an example of valid candidate for SS block center frequency;

FIG. 11 shows another example of subset of valid candidate center frequency for the SS block;

FIG. 12 shows an example of different size of channel raster and synchronization raster;

FIG. 13 shows an example of candidate center frequency for SS block with different size of channel raster and synchronization raster;

FIG. 14a shows an example of a valid SS block candidate center frequency for both a narrowband carrier and a wideband carrier;

FIG. 14b shows another example of valid SS block candidate center frequency for both narrowband carrier and wideband carrier;

FIG. 15 shows an example of arbitrary subcarrier level offset between SS block RB grid and actual system RB grid;

FIG. 16 shows an example of misalignment between SS block resource block (RB) grid and actual system RB grid;

FIG. 17 is a flowchart of gNB procedure to determine SS block center frequency and make indication to UE;

FIG. 18 is a flowchart of UE procedure to search SS block center frequency and derive carrier center frequency;

FIG. 19 shows an example of carrier center frequency indication in master information block (MIB);

FIG. 20 shows an example of carrier center frequency indication in remaining minimum system information (RMSI);

FIG. 21 shows an example of bandwidth (BW) dependent indication of SS block location in MIB;

FIGS. 22a and 22b are a flowchart of gNB procedure to determine SS block center frequency and make indication to UE;

FIG. 23 is a flowchart of UE procedure to search SS block center frequency and derive carrier center frequency;

FIG. 24 shows an example of a network configuring a carrier index to the UE;

FIG. 25 is a flowchart of UE to obtain information of multiple carriers and carrier assigned to the UE;

FIGS. 26, 27 and 28 illustrate multiple SS blocks in a single carrier;

FIG. 29 is a flowchart of UE to obtain information of multiple SS blocks;

FIG. 30 illustrates multiple SS blocks transmitted in a wideband carrier;

FIGS. 31a, 31b and 31c are examples of indication of RMSI control resource set (CORESET) frequency location;

FIG. 32 shows UE procedure to obtain RMSI CORESET frequency resource location information;

FIG. 33 shows an example of indication of limited cases of RMSI CORESET frequency location;

FIG. 34 shows another example of indication of RMSI CORESET frequency location;

FIGS. 35, 36 and 37 show examples of indication cases of RMSI CORESET frequency location;

FIG. 38 shows an example of RMSI CORESET location cases for the same subcarrier spacing case;

FIG. 39 shows an example of RMSI CORESET location cases for the different subcarrier spacing case;

FIG. 40 is a block diagram of a terminal according to an embodiment of the disclosure; and FIG. 41 is a block diagram of a base station according to an embodiment of the disclosure.

Throughout the drawings, like reference numerals will be understood to refer to like parts, components, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), or 5G NB (5GNB).

The "UE" is an entity communicating with a BS and may be referred to as the UE, device, mobile station (MS), mobile equipment (ME), or terminal.

A. Basic Operation

Considering an orthogonal frequency division multiplexing (OFDM) based communication system, a resource element can be defined by a subcarrier during on OFDM symbol duration. In the time domain, a transmission time interval (TTI) can be defined which is composed of multiple OFDM symbols. In the frequency domain, a resource block (RB) can be defined which is composed of multiple OFDM subcarriers.

FIG. 3 shows an example of resource grid structure of an OFDM based communication system.

As shown in FIG. 3, the resources can be divided into TTIs in time domain and RBs in frequency domain. Typically, a RB can be a baseline resource unit for resource mapping and scheduling in the frequency domain.

As described in FIG. 2, when a UE accesses to a network, UE first searches the synchronization signals, e.g., a primary synchronization signal (PSS) and a secondary synchronization signal (SSS), to obtain time/frequency synchronization and cell identifier (ID). Similar as other cellular networks, the deployment of the next generation cellular system needs to consider the channel raster requirement. For example in Long Term Evolution (LTE), the channel raster is $\Delta f_{ch\_raster}=100$ kHz for all bands, which means that the carrier center frequency is an integer multiple of 100 kHz. The candidates for a carrier center frequency can be expressed by $f_n=f_0+n\times\Delta f_{ch\_raster}$, where $f_0$ is a reference frequency in a certain frequency band, e.g., $f_0=0$ Hz and n is an integer number to derive a certain carrier center frequency $f_n$. The carrier can be located around a certain center frequency candidate with a given carrier bandwidth.

The size of the synchronization raster of $\Delta f_{sync\_raster}$ determines the granularity that UEs search the synchronization signals in a frequency range, e.g., the PSS/SSS in LTE.

FIG. 4 shows an example of same size of channel raster and synchronization raster.

As shown in the example in FIG. 4, if the synchronization raster is the same as the channel raster, e.g., $\Delta f_{sync\_raster}=\Delta f_{ch\_raster}=100$ kHz, a candidate of carrier center frequency is also a candidate of center frequency for the synchronization signals. In this case, which may be the case in LTE, the center frequency for the synchronization signals can be fixed to the center frequency for a carrier. Here the synchronization signal block (SS block) may include PSS, SSS and physical broadcast channel (PBCH). When a UE is turned on, UE searches the synchronization signals from the SS block center frequency candidates with a step of synchronization raster $\Delta f_{sync\_raster}$. If a UE detects the synchronization signals in a certain frequency $f_n$, the UE assumes that $f_n$ is the SS block center frequency as well as the center frequency of the current carrier.

To allow flexible deployment, it is not mandatory that the SS block center frequency is the same as the center frequency of the corresponding carrier.

FIG. 5 shows another example of same size of channel raster and synchronization raster.

As shown in the example of FIG. 5, the carrier center frequency is $f_n$, and there are multiple SS block center frequency candidates within the carrier. The SS block can be located in a center frequency candidate $f_m$, which is different from $f_n$. In this case, when a UE is turned on, UE searches the synchronization signals from the SS block center frequency candidates. If a UE detects the synchronization signals in a certain frequency $f_m$, the UE cannot assume that the detected frequency $f_m$ is the same as the center frequency of the current carrier.

The size of synchronization raster can be different per frequency range. For example, for frequency ranges supporting a wider carrier bandwidth and operation in a wider frequency spectrum (e.g. above 6 GHz), the larger synchronization raster size can be used, to reduce the searching time for initial access.

FIG. 6 shows an example of different size of channel raster and synchronization raster.

As shown in the example of FIG. 6, the size of synchronization raster is larger than the size of the channel raster, i.e., $\Delta f_{sync\_raster}>\Delta f_{ch\_raster}$. The candidates of carrier center frequency can be expressed by $f_{ch,n}=f_0+n\times\Delta f_{ch\_raster}$, while the candidates of SS block center frequency can be expressed by $f_{sync,m}=f_0+m\times\Delta f_{sync\_raster}$. Assuming that $\Delta f_{sync\_raster}=k\times\Delta f_{ch\_raster}$, where k is a pre-defined positive integer number to denote the ratio of synchronization raster size and channel raster size, the candidates of SS block center frequency are k times sparser compared to the candidates of the carrier center frequency. Different value of k can be used in different frequency ranges. Similarly, it is not possible that the SS block center frequency always aligns with the center frequency of the corresponding carrier. If a UE detects the synchronization signals based on the synchronization raster in a certain frequency $f_{sync\_m}$, the UE cannot assume that the detected frequency $f_{sync,m}$ is the same as the center frequency of the current carrier.

Therefore, compared to the conventional cellular systems, there is a need to inform UEs where the SS block center frequency is and where the actual carrier center frequency location is. Then based on the system bandwidth information, the actual frequency resources occupied by the carrier in the frequency band can be obtained by UEs.

FIG. 7 shows an example of SS Block including PSS, SSS and PBCH.

Referring to FIG. 7 showing the example of SS block, it has two types of synchronization signals; PSS and SSS, and one broadcast channel, PBCH. PSS, SSS and PBCH can be transmitted within an SS block in a time division multiplexing (TDM) manner. New radio-PBCH (NR-PBCH) is a non-scheduled broadcast channel carrying at least a part of minimum system information (master information block, MIB) and periodicity predefined depending on carrier frequency range. In the example of FIG. 7, the PSS is transmitted in 144 subcarriers in one OFDM symbol, so does SSS. The PBCH is transmitted in 288 subcarriers during two OFDM symbols. For a given frequency band, the SS blocks can be transmitted based on a default subcarrier spacing in the pre-defined time and frequency resources. UE may be able to identify OFDM symbol index, slot index in a radio frame and radio frame number from an SS block. Some other remaining minimum system information, e.g., denoted by RMSI or system information block 1 (SIB1), can be scheduled by a control channel and transmitted in a data channel.

B. Determination of SS Block Center Frequency

Assume that a base station (denoted by gNB for next generation cellular networks) decides the carrier center frequency and carrier bandwidth in a frequency range, there may be multiple SS block center frequency candidates which can be searched by UE based on the synchronization raster size. Based on predefined rules or conditions, there can be one or more valid SS block center frequency candidates which are valid for transmission of a SS block in a given carrier. The rules or conditions are predefined and are known to both gNB and UEs. The number of valid SS block center frequency candidates can be determined by considering the carrier bandwidth (BW), carrier center frequency, and channel raster size and synchronization raster size. The gNB may select one valid SS block center frequency candidate for transmission of a SS block in a carrier. To enable UE obtain the information of carrier center frequency and/or other related information, gNB may need to send extra indication if there are multiple valid SS block center frequency candidates. Different methods can be considered to determine the valid SS block center frequency candidates.

Case with Same Size of Channel Raster and the Synchronization Raster

In case that the size of channel raster and the synchronization raster is the same, i.e., $\Delta f_{sync\_raster}=\Delta f_{ch\_raster}$, the following methods to determine valid SS block center frequency candidates can be considered.

Method 1: In a given carrier, there is one valid SS block center frequency candidate, which has a predefined relationship with the center frequency for a carrier. For example, the SS block center frequency can be the same as the center frequency of a carrier. After the gNB determines the center frequency for a carrier, e.g., $f_n$, the center frequency for the carrier is by default the center frequency for transmission of the SS block. This is the case shown in FIG. 4 described above. In this case, there is no need of indication about the location of SS block and carrier center frequency, since the location of SS block and carrier center frequency can be derived by UE based on the predefined relationship.

Method 2: In a given carrier, there are more than one valid SS block center frequency candidates. There are some pre-defined restrictions on the valid SS block center frequency candidates in the carrier.

Embodiment 1: One restriction of the valid SS block center frequency candidates can be that at least the SS block transmission is not out of the carrier BW, which can be expressed by $$|f_n - f_m| \le \frac{BW_{carrier} - BW_{SS}}{2},$$

where $BW_{carrier}$ is the carrier BW, or can be considered the actual transmission BW considering any possible guard band in the edge sides of the carrier, $BW_{SS}$ is the BW of the SS block. $f_n$ is the carrier center frequency determined by the gNB, and $f_m$ is the valid candidate for SS block center frequency.

FIG. 8 shows an example of valid candidate for SS block center frequency.

In the example of FIG. 8, the several candidates for the SS block center frequency around the carrier center frequency are valid, but the several candidates for the SS block center frequency in both edge sides of the carrier are not valid.

Embodiment 2: Additional restriction of the valid SS block center frequency candidates can be the additional alignment in the frequency resource grid in the carrier. For example, the resource grid in the frequency domain can be determined based on the carrier center frequency, subcarrier spacing, and RB size, and so on. Given a carrier center frequency determined by gNB, the valid SS block center frequency candidates can be restricted to the ones aligned with a certain resource grid, e.g., aligned with the RB boundary or RB center in the carrier. When aligned with RB boundary, the condition can be expressed by $\mathrm{mod}(|f_n-f_m|, BW_{RB})=0$ where $BW_{RB}$ is the RB size with the subcarrier spacing used in the SS block, $f_n$ is the carrier center frequency determined by the gNB, and $f_m$ is the valid candidate of SS block center frequency. This may make the resource mapping of synchronization signals easier, since the resource mapping is usually based on the unit of RBs.

FIG. 9 shows another example of valid candidate center frequency for the SS block.

For example, the same size of channel raster and synchronization raster is used, e.g., 100 kHz, and the RB size is 180 kHz assuming subcarrier spacing of 15 kHz and 12 subcarriers per RB. Referring to FIG. 9, the RB boundary is aligned with carrier center frequency. The carrier center frequency is one valid candidate of SS block center frequency, and the next valid candidate is 900 kHz farther from the carrier center frequency, to make the SS block center frequency aligned with RB boundary. In other words, the offset between two valid candidates of SS block center frequency is the lowest common multiple of the size of synchronization raster and size of RB.

Embodiment 3: One restriction of the valid SS block center frequency candidates can be that only a subset of SS block center frequency satisfying a pre-defined rule.

FIG. 10 shows an example of valid candidate for SS block center frequency.

Referring to FIG. 10, the subset can be compromised by the L valid SS block center frequency candidates, which are closest to the carrier center frequency.

FIG. 11 shows another example of subset of valid candidate center frequency for the SS block.

Alternatively, referring to FIG. 11, the subset can be compromised by the L valid candidate center frequency for the synchronization signals, where the two neighbor candidates has a pre-defined separation, e.g., a pre-defined integer times of channel raster size, or RB size, etc.

The size of L can be pre-defined, or depend on the system bandwidth.

Embodiment 4: The combination of the above conditions, e.g., in Embodiment 1 and 2 and other conditions and restrictions can also be considered. The pre-defined conditions are known to both gNB and UE.

In method 2, the number of valid SS block center frequency candidates may be determined by the carrier BW, channel raster size, and RB size, etc. Assuming that the channel raster is fixed at least in a given frequency band, and RB size is known to the UE based on detection of SS block, the UE at least needs to know the BW information and hence to know how many valid center frequency candidates for SS block. Then, the selected valid candidate can be indicated to the UE. The number of valid center frequency candidates affects the indication overhead. If the BW information is not available, the SS block location in the carrier can be indicated, which enable UE to derive partial carrier information, e.g., the lowest frequency edge side in the carrier.

Case with Different Size of Channel Raster and the Synchronization Raster

The following describes the case that the synchronization raster size is larger than the channel raster size, i.e., $\Delta f_{sync\_raster} > \Delta f_{ch\_raster}$. It is assumed that $\Delta f_{sync\_raster} = k \times \Delta f_{ch\_raster}$, where k is a pre-defined positive integer number. In other words, the center frequency candidates for synchronization signals are k times sparser compared to the center frequency candidates for the carrier.

FIG. 12 shows an example of different size of channel raster and synchronization raster.

Specifically, the example of k=3 is shown in FIG. 12. The candidates of carrier center frequency can be expressed by $f_{ch,n} = f_0 + n \times \Delta f_{ch\_raster}$, while the candidates of center frequency for the synchronization signals can be expressed by $f_{sync,m} = f_0 + m \times f_{sync\_raster}$. The following methods can be considered to determine valid candidates of center frequency for the synchronization signals.

Method 1: In a given carrier, there is one valid candidate of SS block center frequency. After the gNB determines the center frequency for a carrier, e.g., $f_{ch,n}$, the valid candidate of SS block center frequency $f_{sync,m}$, can be determined by a pre-defined rule.

Embodiment 1: The first candidate of SS block center frequency in the higher frequency side than the carrier center frequency is the valid one, which can be expressed by $f_{sync,m} \geq f_{ch,n}$ & $m = \min_m(f_{sync,m} - f_{ch,n})$. For example in FIG. 12, $f_{sync,m+1}$ is the valid candidate of center frequency for SS block transmission.

Embodiment 2: The first candidate of SS block center frequency in the lower frequency side than the carrier center frequency is the valid one, which can be expressed by $f_{sync,m} \leq f_{ch,n}$ & $m = \min_m(f_{ch,n} - f_{sync,m})$. For example in FIG. 12, $f_{sync,m}$ is the valid candidate of center frequency selected for transmission of SS block.

Embodiment 3: The closest candidate of SS block center frequency to the carrier center frequency is the valid one, which can be expressed by $m = \min_m |f_{ch,n} - f_{sync,m}|$. For example in FIG. 12, $f_{sync,m}$ is the valid candidate of center frequency selected for transmission of SS block since $f_{sync,m}$ is the closest candidate of SS block center frequency to the carrier center frequency. In case there can be multiple candidates with same minimum distance to the carrier center frequency, a pre-defined rule can be used to select one from them, e.g., the candidate in the higher frequency side than the carrier center frequency or in the lower frequency side.

In this method, even though there is one valid candidate of SS block center frequency, indication is still needed to enable UE derive the carrier center frequency, because the size of channel raster and synchronization raster is different. For the embodiments above, UE needs to know the location difference between the carrier center frequency and SS block center frequency. There are k possibilities, which can be indicated by $\lceil \log_2 k \rceil$ bits to derive the relative location difference.

Additional conditions in the above embodiments can be also considered to select the valid candidate of center frequency for transmission of SS block. For example, the valid SS block center frequency candidate can be restricted to the ones aligned with the RB boundary or RB center in the carrier. The condition can be expressed by $\mod(|f_{ch,n} - f_{sync,m}|, BW_{RB}) = 0$ where $BW_{RB}$ is the RB size with the subcarrier spacing used in the SS block. This condition can be considered together in the above embodiments to determine the center frequency candidate for transmission of SS block.

FIG. 13 shows an example of candidate center frequency for SS block with different size of channel raster and synchronization raster.

As shown in the example in FIG. 13, $f_{sync,m}$ is the valid center frequency selected for transmission of SS block, considering the conditions of Embodiment 3 and RB boundary alignment. In this case, if the relative distance between the carrier center frequency and a reference SS block center frequency candidate is indicated, the location of carrier center frequency can be derived by UE in an implicit manner, by applying the RB boundary alignment condition. For example, considering that the reference SS block center frequency candidate is the one in the lower or higher frequency side than the carrier center frequency, the relationship between the carrier center frequency and valid SS block center frequency candidate can be obtained based on a rule in a certain embodiment. Then UE can derive the location of carrier center frequency based on the detected center frequency for SS block. So, $\lceil \log_2 k \rceil$ bits can be used for indication. Alternatively, the offset between carrier center frequency and SS block carrier frequency can be indicated in terms of number of RB size.

Method 2: In a given carrier, there can be more than one valid SS block center frequency candidates. There are some pre-defined restrictions on the valid SS block center frequency candidates in the carrier.

Embodiment 1: One restriction of the valid SS block center frequency candidates can be that at least the SS block transmission is not out of the carrier BW, which can be expressed by $$|f_{ch,n} - f_{sync,m}| \leq \frac{BW_{carrier} - BW_{SS}}{2},$$

where $BW_{carrier}$ is the carrier BW, or can be considered the actual transmission BW considering any possible guard band in the edge sides of the carrier, $BW_{SS}$ is the BW of the SS block. $f_{ch,n}$ is the carrier center frequency determined by the gNB, and $f_{sync,m}$ is the valid candidate for SS block center frequency.

Embodiment 2: Additional restriction of the valid SS block center frequency candidates can be the additional alignment in the frequency resource grid in the carrier. For example, the resource grid in the frequency domain can be determined based on the carrier center frequency, subcarrier spacing, and RB size, and so on. Given a carrier center frequency determined by gNB, the valid SS block center frequency candidates can be restricted to the ones aligned with a certain resource grid, e.g., aligned with the RB boundary or RB center in the carrier. When aligned with RB boundary, the condition can be expressed by $\mod(|f_{ch,n} - f_{sync,m}|, BW_{RB}) = 0$ where $BW_{RB}$ is the RB size with the subcarrier spacing used in the SS block, $f_{ch,n}$ is the carrier center frequency determined by the gNB, and $f_{sync,m}$ is the valid candidate of SS block center frequency.

Embodiment 3: One restriction of the valid SS block center frequency candidates can be that only a subset of SS block center frequency satisfying a pre-defined rule. For example, the subset can be compromised by the L valid SS block center frequency candidates, which are closest to the carrier center frequency. Or, the subset can be compromised by the L valid candidate center frequency for the synchronization signals, where the two neighbor candidates has a pre-defined separation, e.g., a pre-defined integer times of channel raster size, or RB size, etc. The size of L can be pre-defined, or depend on the system bandwidth.

Embodiment 4: The combination of the above conditions, e.g., in Embodiment 1 and 2 and other conditions and restrictions can also be considered. The pre-defined conditions are known to both gNB and UE.

In method 2, the number of valid center frequency candidates for SS block may be determined by the carrier BW, channel raster size, and RB size, etc. Assuming that the channel raster is fixed at least in a given frequency band, and RB size is known to the UE based on detection of SS block, the UE at least needs to know the BW information and hence to know how many valid center frequency candidates for SS block. Then, the selected valid candidate can be indicated to the UE. The number of valid center frequency candidates affects the indication overhead.

Regardless of the difference between the channel raster size and synchronization raster size, if there are multiple overlapped carriers, e.g., a wideband carrier and a narrowband carrier coexist and overlap in the frequency domain, one SS block may be transmitted and the SS block can be used as a shared SS block for a wideband carrier and a narrowband carrier. Based on the pre-defined rule, the location of a valid center frequency SS block candidate needs to satisfy the condition and restriction for both the wideband carrier and the narrowband carrier.

FIG. 14a shows an example of a valid SS block candidate center frequency for both a narrowband carrier and a wideband carrier.

As shown in FIG. 14a, the SS block is transmitted in the 1st candidate SS block center frequency which is a valid one in the narrowband carrier, as well as a valid one in the wideband carrier.

FIG. 14b shows another example of valid SS block candidate center frequency for both narrowband carrier and wideband carrier.

As shown in FIG. 14b, one SS block is transmitted in the 1st candidate SS block center frequency which is a valid one in the narrowband carrier #0, as well as a valid one in the wideband carrier. Another block is transmitted in the $3^{rd}$ candidate SS block center frequency which is a valid one in the narrowband carrier #1, as well as a valid one in the wideband carrier.

C. Indication Methods to Derive SS Block Location and Carrier Center Frequency

In different cases, based on the pre-defined rule, there may be different possibilities of SS block center frequency candidates. To enable UE obtain the information of carrier, e.g., carrier edge or center frequency, gNB may need to send indication related to the SS block center frequency and/or carrier center frequency.

Case with Same Size of Channel Raster and the Synchronization Raster

In case that the size of channel raster and the synchronization raster is the same, i.e., $\Delta f_{sync\_raster} = \Delta f_{ch\_raster}$, the following indication methods can be considered.

Method 1: If there is one valid SS block center frequency candidate in a carrier, there is no need of explicit indication and UE may derive the carrier center frequency in an implicit manner based on the fixed relationship between the carrier center frequency and SS block center frequency.

Method 2: Given a number of valid SS block center frequency candidates in a carrier, e.g., N, $\lceil \log_2 N \rceil$ bits can be used to indicate the possibilities, each corresponding one valid candidate. Based on the relationship between the carrier center frequency and valid SS block center frequency candidates, the information of carrier center frequency can be derived. The number of candidates N may depend on the system bandwidth, channel raster size, RB size and so on. Assuming that the channel raster is fixed at least in a given frequency band, and RB size is known to the UE based on detection of SS block, the number of candidates N may depend on the BW information. Therefore, the number of candidates N and required indication bits can be determined by the BW indication.

Method 3: Given a number of valid SS block center frequency candidates in a carrier, e.g., N, there can be one bit field to indicate if the SS block center frequency and the carrier center frequency satisfy a pre-defined relationship. An example relationship is that the SS block center frequency is the same as the carrier center frequency. If the field is indicated as true, that means the pre-defined relationship is satisfied, the location of carrier center frequency can be implicitly derived from the SS block center frequency, and there is no need of further indication. Otherwise, i.e., the field is indicated as false, another field may further indicate the information of valid SS block center frequency candidate in the carrier. As in Method 2, $\lceil \log_2 N \rceil$ bits can be used to indicate the possibilities. Or, by precluding the carrier center frequency, the remaining number of valid center frequency candidates for SS block in a carrier is N−1, and $\lceil \log_2(N-1) \rceil$ bits can be used to indicate the possibilities, each corresponding one valid candidate. Based on the relationship between the carrier center frequency and valid SS block center frequency candidates, the information of carrier center frequency can be derived.

Method 4: If the SS block center frequency has a certain restriction on the RB boundary alignment, an index of a reference RB occupied by the SS block can be indicated. The location of the reference RB has a fixed relationship with the SS block. For example, the reference RB can be the RB closest to the center of SS block in a certain frequency side (higher or lower). Or, the reference RB can be the RB in the lower frequency edge side of the SS block. The RB index in the full system bandwidth can be signaled, e.g., by $\lceil \log_2 N_{RB}^{DL} \rceil$ bits. $N_{RB}^{DL}$ is the maximum number of RBs in the downlink carrier bandwidth based on the numerology of SS block. Or, a function of the RB index can be signaled. This can provides the location of SS block in terms of occupied RBs, and the carrier center frequency can be implicitly derived based in RB location of SS block and full system bandwidth information. When the system BW information is not available, e.g., not signaled in system information, the UE can at least derive the location of lowest frequency side of the carrier.

If the SS block center frequency has no restriction on the RB boundary alignment, the SS block is not exactly aligned with the actual RB grid.

FIG. 15 shows an example of arbitrary subcarrier level offset between SS block RB grid and actual system RB grid.

Referring to FIG. 15, there can be arbitrary offset of 0 to 11 subcarriers between the SS block RB grid and actual system RB grid. So, one RB in a SS block may span two RBs of the actual RB grid.

FIG. 16 shows an example of misalignment between SS block RB grid and actual system RB grid.

For example in FIG. 16, The lower frequency side RB in the SS block span 3 subcarriers in a RB with index N and 4 subcarriers in a RB with index N+1. The subcarrier offset needs to be further indicated, e.g., by 4 bits. The offset can be defined by the difference in terms of number of subcarriers between the lowest subcarrier in the SS block and the adjacent lower subcarrier of the actual RB in the lower frequency side. The offset can be defined by other rules. The subcarrier offset can be indicated in the MIB, and hence UE can derive actual RB grid after receiving SS block, and then get further information such as offset or RB index of SS block in RMSI.

Depending on the case if SS block is always aligned with RB boundary or not, or may align with RB boundary in some situations, e.g., depending on the frequency range or raster size cases, the subcarrier offset can be always indicated, which make common MIB contents for all cases. Or, the subcarrier offset can be indicated depending on the conditions if the subcarrier offset is needed, e.g., not needed in lower frequency ranges, or needed in higher frequency ranges. So this may result in different MIB contents.

Method 5: The can be one bit field to indicate if the SS block center frequency and the carrier center frequency satisfy a pre-defined relationship. An example relationship is that the SS block center frequency is the same as the carrier center frequency. If the field is indicated as true, that means the pre-defined relationship is satisfied, the location of carrier center frequency can be implicitly derived from the SS block center frequency, and there is no need of further indication. Otherwise, i.e., the field is indicated as false, another field may further indicate the information of valid SS block center frequency candidate in the carrier. As in Method 4, an index of a reference RB occupied by the SS block can be indicated. The RB index in the full system bandwidth is signaled, e.g., by $\lceil \log_2 N_{RB}^{DL} \rceil$ bits.

Case with Different Size of Channel Raster and the Synchronization Raster

In case that the size of channel raster and the synchronization raster is different, assuming $\Delta f_{sync\_raster} = k \times \Delta f_{ch\_raster}$, where k is a pre-defined positive integer number, the following indication methods can be considered.

Method 1: Assuming that there is one valid SS block center frequency candidate in a carrier, and location of the center frequency candidate can be determined by knowing the relative distance between the carrier center frequency and surrounding SS block center frequency candidates. For example, this relative distance can be expressed by $$\frac{\mod(f_{ch,n}, \Delta f_{sync\_raster})}{\Delta f_{ch\_raster}},$$

which have k possibilities, {0, 1, 2, . . . , k−1}, and can be indicated by $\lceil \log_2 k \rceil$ bits. The indication can be interpreted as the relative distance between the carrier center frequencies to a reference center frequency candidate for SS block. Based on the relationship between the carrier center frequency and valid SS block center frequency candidate, the information of carrier center frequency can be derived.

Method 2: If there is one valid SS block center frequency candidate in a carrier, there can be one bit field to indicate if the SS block center frequency and the carrier center frequency satisfy a pre-defined relationship, e.g., the SS block center frequency is the same as the carrier center frequency. If the field is indicated as true, that means the pre-defined relationship is satisfied, the location of carrier center frequency can be implicitly derived from the SS block center frequency, and there is no need of further indication. Otherwise, i.e., the field is indicated as false, another field may further indicate the k possibilities by $\lceil \log_2 k \rceil$ bits. Or, the following field may indicate the remaining (k−1) possibilities by $\lceil \log_2(k-1) \rceil$ bits if the pre-defined relationship in the one bit field is that the SS block center frequency is the same as the carrier center frequency.

Method 3: Given a number of valid SS block center frequency candidates in a carrier, e.g., N, $\lceil \log_2 N \rceil$ bits can be used to indicate the possibilities, each corresponding to one valid candidate. The relative distance between the carrier center frequency and surrounding center frequency candidates for SS block with $\lceil \log_2 k \rceil$ bits needs to be indicated together. Based on the relationship between the carrier center frequency and valid SS block center frequency candidates, the information of carrier center frequency can be derived. The number of valid candidates N may depend on the system bandwidth, channel raster size, RB size and so on. Assuming that the channel raster size and synchronization raster size are fixed at least in a given frequency band, and RB size is known to the UE based on detection of SS block, the number of valid candidates N may depend on the BW information. Therefore, the number of candidates N and required indication bits can be determined by the BW indication. The combined cases of multiple relative distance between the carrier center frequency and surrounding center frequency candidates for SS block and multiple valid SS block center frequency candidates can be jointly indicated, e.g., with $\lceil \log_2 Nk \rceil$ bits.

Method 4: Given a number of valid SS block center frequency candidates in a carrier, e.g., N, there can be one bit field to indicate if the SS block center frequency and the carrier center frequency satisfy a pre-defined relationship, e.g., the SS block center frequency is the same as the carrier center frequency. If the field is indicated as true, that means the pre-defined relationship is satisfied, the location of carrier center frequency can be implicitly derived from the SS block center frequency, and there is no need of further indication. Otherwise, another field may further indicate the valid candidate by $\lceil \log_2 N \rceil$ bits. The relative distance between the carrier center frequency and surrounding center frequency candidates for SS block with $\lceil \log_2 k \rceil$ bits needs to be indicated together. The combined cases of multiple relative distance between the carrier center frequency and surrounding center frequency candidates for SS block and multiple valid SS block center frequency candidates can be jointly indicated, e.g., with $\lceil \log_2 Nk \rceil$ bits.

Method 5: If the SS block center frequency has a certain restriction on the RB boundary alignment, an index of a reference RB occupied by the SS block can be indicated. The location of the reference RB has a fixed relationship with the SS block. For example, the reference RB can be the RB closest to the center of SS block in a certain frequency side (higher or lower). The RB index in the full system bandwidth can be signaled, e.g., by $\lceil \log_2 N_{RB}^{DL} \rceil$ bits. $N_{RB}^{DL}$ is the number of RBs in the downlink carrier bandwidth based on the numerology of SS block. Or, a function of the RB index can be signaled. This can provides the location of SS block in terms of occupied RBs, and the carrier center frequency can be implicitly derived based in RB location of SS block and full system bandwidth information. When the system BW information is not available, e.g., not signaled in system information, the UE can at least derive the location of lowest frequency side of the carrier.

If the SS block center frequency has no restriction on the RB boundary alignment, the SS block is not exactly aligned with the actual RB grid. For example in FIG. 16, one RB in a SS block may span two RBs of the actual RB grid. The lower frequency side RB in the SS block span 3 subcarriers in a RB with index N and 4 subcarriers in a RB with index N+1. The subcarrier offset needs to be further indicated, e.g., by 4 bits. The offset can be defined by the difference in terms of number of subcarriers between the lowest subcarrier in the SS block and the adjacent lower subcarrier of the actual RB in the lower frequency side. The offset can be defined by other rules. The subcarrier offset can be indicated in the MIB, and hence UE can derive actual RB grid after receiving SS block, and then get further information such as offset or RB index of SS block in RMSI.

Similarly, depending on the case if SS block is always aligned with RB boundary or not, or may align with RB boundary in some situations, e.g., depending on the frequency range or raster size cases, the subcarrier offset can be always indicated, which make common MIB contents for all cases. Or, the subcarrier offset can be indicated depending on the conditions if the subcarrier offset is needed, e.g., not needed in lower frequency ranges, or needed in higher frequency ranges. So this may result in different MIB contents.

Method 6: There can be one bit field to indicate if the SS block center frequency and the carrier center frequency satisfy a pre-defined relationship, e.g., the SS block center frequency is the same as the carrier center frequency. If the field is indicated as true, that means the pre-defined relationship is satisfied, the location of carrier center frequency can be implicitly derived from the SS block center frequency, and there is no need of further indication. Otherwise, i.e., the currently detected SS block center frequency is not the carrier center frequency; another field may further indicate the information of valid SS block center frequency candidate in the carrier. As in Method 5, an index of a reference RB occupied by the SS block can be indicated. The RB index in the full system bandwidth can be signaled, e.g., by $\lceil \log_2 N_{RB}^{DL} \rceil$ bits.

The number of valid SS block center frequency candidates in a carrier is affected by many factors, e.g., channel raster size, synchronization raster size, and rules of determining the valid SS block center frequency candidates, such as RB size, BW, etc. In different frequency bands, the channel raster size may be different, the synchronization raster size may be different and the supported carrier BW and RB size may also be different. Based on the pre-defined rule, there are different possibilities of SS block center frequency candidates, and different indication methods may be used in different cases.

FIG. 17 is a flowchart of gNB procedure to determine SS block center frequency and make indication to UE.

Referring to FIG. 17, gNB determines frequency range for a carrier deployment at operation 1710. The gNB decides carrier center frequency based on channel raster size requirement and carrier BW at operation 1720. The gNB checks number and location of valid SS block center frequency candidates within the carrier based on the pre-define rule at operation 1730. If there is more than one valid SS block center frequency candidates, the gNB selects one valid SS block center frequency candidate for SS block transmission at operation 1740, and indicates information related to the selected SS block center frequency candidate and/or carrier center frequency at operation 1750. Otherwise, i.e., if there is only one valid SS block center frequency candidate, the gNB decides the valid block center frequency candidate for SS block transmission at operation 1760. If any indication is needed, the gNB indicates information related to the selected SS block center frequency candidate and/or carrier center frequency at operation 1750. Otherwise, i.e., if there is no need of any indication, the gNB does not make indication to UE at operation 1770.

FIG. 18 is a flowchart of UE procedure to search SS block center frequency and derive carrier center frequency.

Referring to FIG. 18, UE determines a frequency range for searching the carrier at operation 1810. The UE searches the synchronization signals based on synchronization raster size requirement in the frequency range at operation 1820. The UE detects synchronization signals and receives system information in MIB carried by PBCH and/or RMSI (e.g. SIB1) at operation 1830. The UE checks number of valid SS block center frequency candidates within the carrier based on the pre-defined rule at operation 1840. If there is more than one valid SS block center frequency candidates, the UE obtains indication related to the selected SS block center frequency candidate and carrier center frequency at operation 1850, and derives actual location of SS block center frequency and carrier center frequency based on pre-defined rule at operation 1860. Otherwise, i.e., if there is only one valid SS block center frequency candidate, the UE determines whether there is any indication at operation 1870. If there is any indication, the UE obtains indication related to the selected SS block center frequency candidate and carrier center frequency at operation 1850, and derives actual location of SS block center frequency and carrier center frequency based on pre-defined rule at operation 1860. Otherwise, i.e., if there is no indication, the UE derives actual location of SS block center frequency and carrier center frequency based on pre-defined rule at operation 1880.

Assume that the synchronization signals (PSS/SSS) and PBCH have the same center frequency and the SS block center frequency may be different from the carrier center frequency, the information related to the SS block center frequency and carrier center frequency can be indicated in the MIB, or RMSI, or both MIB and RMSI, e.g., partial information in MIB and partial information in RMSI. Together with the system bandwidth information, the frequency resources occupied by the carrier can be obtained.

FIG. 19 shows an example of carrier center frequency indication in MIB.

In the example of FIG. 19, the carrier center frequency can be derived based on the indication in MIB.

FIG. 20 shows an example of carrier center frequency indication in RMSI.

In the example of FIG. 20, the carrier center frequency can be derived based on the indication in RMSI.

Indication in MIB

In the MIB, the information related to the SS block center frequency and carrier center frequency can be indicated. In a given frequency range, the size of channel raster and synchronization raster is pre-defined. The indication related to the SS block center frequency and carrier center frequency may or may not depend on the system bandwidth, e.g., may only depend on the relationship between the size of channel raster and synchronization raster.

In a given frequency range, if the indication related to the SS block center frequency and carrier center frequency does not depend on the system bandwidth, the number of indication bit can be pre-defined. If the indication related to the SS block center frequency and carrier center frequency depends on the system bandwidth, the number of indication bits can be pre-defined as well to keep the common signaling format in a given frequency range. Or, the indication can be related to the system bandwidth.

FIG. 21 shows an example of BW dependent indication of SS block location in MIB.

As shown in FIG. 21, given an indicated system bandwidth, the following indication can be different. For example for some small BW cases, there is one valid SS block center frequency candidate having fixed relationship with the carrier center frequency, and hence there is no indication related to the valid SS block center frequency. In case of other system bandwidth options, there can be more than one valid SS block center frequency candidates, or one valid SS block center frequency candidates but the relative indication is still needed (e.g., larger synchronization raster size case), there is indication field to signal the information related to the SS block center frequency and carrier center frequency. The indication can be jointly coded with other parameters.

In case that the SS block may not be aligned with the actual system RB grid, the subcarrier offset needs to be indicated in MIB, e.g., by 4 bits.

After receiving MIB in PBCH and obtain carrier center frequency and system BW information, the succeeding UE operation can be based on the full system BW, e.g., to receive the PDCCH and RMSI.

Indication in RMSI

In the RMSI, the information related to the SS block center frequency and carrier center frequency can be indicated. The similar indication approaches can be used for indication.

After receiving MIB in PBCH, if there is no related indication of carrier center frequency and system BW, the succeeding UE operation cannot be based on the full system BW. For example, to receive the PDCCH and RMSI, the UE may need to assume the same BW with the SS block. After receiving RMSI and obtaining carrier center frequency and system BW information, the succeeding UE operation can be based on the full system BW, e.g., to receive the other system information.

Indication in Both MIB and RMSI

In the MIB, partial information related to the SS block center frequency and carrier center frequency can be indicated. For example in MIB, the system BW can be indicated, and there can be 1 bit flag field to indicate if the SS block center frequency and the carrier center frequency satisfy a pre-defined relationship, e.g., the SS block center frequency is the same as the carrier center frequency. If the field is indicated as true, that means the pre-defined relationship is satisfied, the location of carrier center frequency can be implicitly derived from the SS block center frequency, and there is no need of further indication in both MIB and RMSI. Otherwise, the further information of relationship of current SS block center frequency and carrier center frequency is indicated in RMSI. This can minimize the overhead in MIB. The 1 bit flag indication can always exist to enable a common MIB format at least for a given frequency range. Similarly, the existence of 1 bit flag indication in MIB may depend on the cases. 1 bit flag indication can be BW dependent indication. For example for some small BW cases, there is one valid SS block center frequency candidate having fixed relationship with the carrier center frequency, and hence there is no indication. In case of other system bandwidth options, there can be more than one valid SS block center frequency candidates, or one valid SS block center frequency candidates but the relative indication is still needed (e.g., larger synchronization raster size case), there is 1 bit flag indication. The indication can be jointly coded with other parameters.

After receiving MIB in PBCH, the UE can know if the carrier center frequency is the same as the SS block center frequency or not. If the same, based on the system BW information, the succeeding UE operation can be based on the full system BW, e.g., to receive the PDCCH and RMSI. If not, the succeeding UE operation cannot be based on the full system BW. For example, to receive the PDCCH and RMSI, the UE may need to assume the same BW with the SS block. After receiving RMSI and obtain carrier center frequency and system BW information, the succeeding UE operation can be based on the full system BW, e.g., to receive the other system information.

FIGS. 22a and 22b are a flowchart of gNB procedure to determine SS block center frequency and make indication to UE.

Referring to FIG. 22a, gNB determines frequency range for a carrier deployment at operation 2210. The gNB decides carrier center frequency based on channel raster size requirement and carrier BW at operation 2220. The gNB checks number and locations of valid SS block center frequency candidates within the carrier based on the pre-define rule at operation 2230. If there is more than one valid SS block center frequency candidates, the gNB selects one valid SS block center frequency candidate for SS block transmission at operation 2240. Otherwise, i.e., if there is only one valid SS block center frequency candidate, the gNB decides the valid block center frequency candidate for SS block transmission at operation 2250.

Referring to FIG. 22b, if there is no need of any indication, the gNB deciding the valid SS block center frequency candidate for SS block transmission at operation 2250, does not make indication to UE at operation 2260. If any indication is needed or the gNB selects one valid SS block center frequency candidate for SS block transmission at operation 2240, the gNB determines whether the SS block center frequency and the carrier center frequency satisfy a pre-defined relationship at operation 2270. If the SS block center frequency and the carrier center frequency satisfy the pre-defined relationship, the gNB indicates as 'True' about pre-defined relationship of SS block center frequency and carrier center frequency in MIB at operation 2280, and there is no additional indication in MIB an RMSI at operation 2285. Otherwise, i.e., the SS block center frequency and the carrier center frequency does not satisfy the pre-defined relationship, the gNB indicates as 'False' about pre-defined relationship of SS block center frequency and carrier center frequency in MIB at operation 2290, and indicates information related to the selected SS block center frequency candidate and/or carrier center frequency at operation 2295.

FIG. 23 is a flowchart of UE procedure to search SS block center frequency and derive carrier center frequency.

Referring to FIG. 23, UE determines a frequency range for searching the carrier at operation 2310. The UE searches the synchronization signals based on synchronization raster size requirement in the frequency range at operation 2320. The UE detects synchronization signals and receives system information in MIB carried by PBCH at operation 2330. The UE determines whether there is a flag indication in the system information at operation 2340. If there is no flag indication or the flag indication in the system information indicates 'True' about pre-defined relationship of SS block center frequency and carrier center frequency, the UE derives actual location of SS block center frequency and carrier center frequency based on pre-defined rule at operation 2350. If the flag indication in the system information indicates 'False' about pre-defined relationship of SS block center frequency and carrier center frequency, the UE receives system information in RMSI (e.g. SIB1) based on configuration in MIB at operation 2360, obtains indication related to the selected SS block center frequency candidate and carrier center frequency at operation 2370, and derives actual location of SS block center frequency and carrier center frequency based on pre-defined rule at operation 2380.

In some cases, the information related to the SS block center frequency and carrier center frequency can be indicated in the other SIBs. The similar indication approaches can be used for indication. The information related to the SS block center frequency and carrier center frequency can be indicated to UEs via RRC configuration.

Multi-Carrier Shared SS Block Case

If a SS block is linked to more than one carrier, e.g., one wideband carrier and one narrowband carrier, the related information of SS block center frequency and carrier frequency can be indicated per carrier.

In one embodiment, the information of the number of carriers and the information of the SS block center frequency and carrier frequency per carrier can be indicated in the RMSI and/or other SIBs. For example, there can be a restriction that a SS block can be shared by a maximum of K carriers, where K is a pre-defined value.

In the related indication field, there can be a first field to indicate the number of carriers linked to the SS block, and then the following indications can be per carrier. In the indication for each carrier, a set of related parameters can be indicated. For example, the DL carrier BW and/or the paired carrier BW (e.g., in frequency division duplex (FDD) case) can be indicated. In addition, the information of the SS block center frequency and carrier frequency can be indicated. For example, the offset between the carrier center frequency and the SS block center frequency can be indicated, in terms of number of physical resource block (PRBs) with a pre-defined numerology, e.g., the numerology used by the SS block. Or, the index of one reference RB related to the SS block can be indicated. For example, the reference RB can be the RB closest to the center of SS block in a certain frequency side (higher or lower). The RB index in the full system bandwidth can be signaled, e.g., by $\lceil \log_2 N_{RB}^{DL} \rceil$. $N_{RB}^{DL}$ is the number of RBs in the downlink carrier bandwidth based on the numerology of SS block, or another pre-defined numerology which is specific to the frequency band. Or, a function of the RB index can be signaled. This can provides the location of SS block in terms of occupied RBs, and the carrier center frequency can be implicitly derived based in RB location of SS block and full system bandwidth information. Since the indications are conveyed in the RMSI and/or SIBs, all UEs can obtain the carrier information and SS block information. The network may configure a UE to operate in a certain carrier, e.g., a wideband carrier or a narrowband carrier. The configuration can be signaled to UE by RRC.

FIG. 24 shows an example of a network configuring a carrier index to the UE.

Since the carrier related information is indicated in RMSI and/or SIBs, the network configure a carrier index to the UE, as shown in the example in FIG. 24.

FIG. 25 is a flowchart of UE to obtain information of multiple carriers and carrier assigned to the UE.

Referring to FIG. 25, UE determines a frequency range for searching the carrier at operation 2510. The UE searches the synchronization signals based on synchronization raster size requirement in the frequency range at operation 2520. The UE detects synchronization signals and receives system information in MIB carried by PBCH and/or RMSI (e.g. SIB1) at operation 2530. The UE receives information of carriers linked to the detected SS block in RMSI and/or SIBs at operation 2540. The UE obtains configuration of assigned carrier from RRC signaling if there are multiple carriers at operation 2550. The UE derives actual location of SS block center frequency and carrier center frequency based on pre-defined rule at operation 2560.

In another case, the information of all carriers is not signaled in the RMSI and/or SIB, the network signals the UE-specific carrier information in RRC. Similarly, the information of the carrier bandwidth, and information related to the SS block center frequency and carrier center frequency can be indicated.

Single Carrier with Multiple SS Blocks

It is possible that multiple SS blocks can be transmitted in a carrier, e.g., in a wideband carrier case. Each SS block may correspond to its own RMSI and SIBs.

FIGS. 26, 27 and 28 illustrate multiple SS blocks in a single carrier.

As shown in FIG. 26, there is a Set #0 of SS block #0 and corresponding RMSI and/or SIBs, and there is another Set #1 of SS block #1 and corresponding RMSI and/or SIBs. If the carrier information is signaled in RMSI and/or SIBs, it can be transmitted individually in each set of RMSI and/or SIBs, e.g., about carrier BW and information of the SS block center frequency and carrier center frequency. Due to the different location of different SS blocks, the information can be different in different RMSI and/SIBs. In addition, the presence of other SS blocks and related transmission information of RMSI and/or SIBs can be indicated in the RMSI and/SIBs. That means, in RMSI and/or SIBs in Set #0, the information of SS block #0 is signaled. In addition, the information of SS block #1 and corresponding Set #1 of RMSI and/or SIBs is signaled as well. The cell ID of SS block #1 can be indicated. After obtaining the information of resources occupied by all the SS blocks and RMSI/SIBs, these resources may not be used for data transmission. For example, the UE may assume that the resources are rate matched if there are data transmissions assigned to UE.

In some case, one SS block has its own RMSI and SIBs while another SS block may not have corresponding RMSI and/or SIBs, as shown in FIG. 27. In this case, the RMSI and/or SIBs indicates that the presence of other SS block only, and indicate that there is not corresponding RMSI and/or SIBs transmission. In another case, the signals (PSS/SSS) and channels (PBCH) in a SS block may be not all transmitted. For example, only the PSS/SSS is transmitted in a certain SS block, and there is no PBCH and RMSI/SIB transmission. This can be considered as a thin SS block, which is transmitted for certain purpose only, e.g., for measurements. The information of the presence of a thin SS block and the components in the SS block can be indicated.

In another case, multiple SS blocks may have shared RMSI and SIBs, as shown in FIG. 28. The information of all SS blocks can be indicated in the RMSI and/or SIBs.

FIG. 29 is a flowchart of UE to obtain information of multiple SS blocks.

Referring to FIG. 29, UE determines a frequency range for searching the carrier at operation 2910. The UE searches the synchronization signals based on synchronization raster size requirement in the frequency range at operation 2920. The UE detects synchronization signals and receives system information in MIB carried by PBCH at operation 2930. The UE determines whether there is an associated RMSI indicated in MIB at operation 2940. If there is an associated RMSI indicated in MIB, the UE obtains indication related to the carrier and SS blocks in RMSI and/or SIBs at operation 2950, derives actual location of detected SS block center frequency and carrier center frequency based on pre-defined rule at operation 2960, and derives information of other SS blocks and/or related RMSI/SIB resource for other purposes at operation 2970.

Extended Combinations

In some case, one SS block may be shared by multiple carriers, and there can be multiple SS blocks transmitted in a certain carrier, e.g., in a wideband carrier case.

FIG. 30 illustrates multiple SS blocks transmitted in a wideband carrier.

This is the combination case of the previous cases. As described, each SS block may correspond to its own RMSI and SIBs. The carrier information is signaled in the RMSI and/or SIBs. In addition, for each carrier, the presence of multiple SS block and/or RMSI and/or SIBs is signaled. This includes the case that a certain SS block may not have the corresponding RMSI and/or SIBs, or a certain SS block is a kind of thin SS block and only part of the signals (PSS/SSS) and/or channels (PBCH) is transmitted.

In another case, multiple SS blocks may have shared RMSI and SIBs, as shown in FIG. 30. The information of all carriers and SS blocks can be indicated in the RMSI and/or SIBs.

D. RMSI Reception

RMSI Numerology Indication in MIB

Assume that the system supports multiple subcarrier spacing values, e.g., $\Delta f_0$, $\Delta f_1$, $\Delta f_2$, $\Delta f_3$, ..., $\Delta f_{N-1}$ (where $\Delta f_n < \Delta f_{n+1}$, $0 \le n < N-1$); the usage of certain subcarrier spacing may depend on the service and system requirement, as well as the frequency range. To reduce the complexity in the initial access, the subcarrier spacing for SS block can be pre-defined or selected by gNB from the full set or a subset of the supported subcarrier spacing values. The same subcarrier spacing can be used for synchronization and PBCH transmission. However, the subcarrier spacing for control channel (PDCCH) scheduling RMSI transmission can be different from the subcarrier spacing used for synchronization and PBCH transmission. Hereafter the control channel (PDCCH) scheduling RMSI transmission means the RMSI control resource set (CORESET) which includes a set of RBs and symbols to convey the PDCCH which schedules RMSI.

The subcarrier spacing used for RMSI CORESET for PDCCH scheduling RMSI transmission can be indicated in the payload of PBCH, i.e., MIB. The RMSI PDCCH and RMSI PDSCH can have the same subcarrier spacing. The following indication methods can be used:

Option 1: Implicit indication of the PDCCH subcarrier spacing, which means there may be no indication and the same numerology with PBCH is used for PDCCH subcarrier spacing.

Option 2: Explicitly indicating the PDCCH subcarrier spacing among a pre-defined subcarrier spacing subset. For example, the full set of subcarrier spacing can be divided into multiple subsets, each corresponding to a certain frequency range, e.g., one pre-defined subset for lower frequency bands (e.g., below-6 GHz frequency band) and another pre-defined subset for higher frequency bands (e.g., above-6 GHz frequency band). Since the subcarrier spacing used by synchronization and PBCH may be different for different frequency bands, there can be several pre-defined subcarrier spacing subsets, and each subset corresponds to one subcarrier spacing used by the synchronization and PBCH. The number of subcarrier spacings in each subset can be different, and hence may have different number of signaling bits, depending on the frequency range, or subcarrier spacing used by the synchronization and PBCH. The following examples can be considered:

1) SS block subcarrier spacing (SCS)=15 kHz→RMSI numerology can be 15 kHz or 30 kHz or 60 kHz based on indication 2) SS block SCS=30 kHz→RMSI numerology can be 15 kHz or 30 kHz or 60 kHz based on indication 3) SS block SCS=120 kHz→RMSI numerology can be 60 kHz or 120 kHz or 240 kHz based on indication 4) SS block SCS=240 kHz→RMSI numerology can be 60 kHz or 120 kHz or 240 kHz based on indication So 2 bits can be used to indicate up to 4 possibilities of used RMSI numerology.

Option 3: There can be 1 bit indication to indicate if the subcarrier spacing used for PDCCH is the same as that used by SS block or a pre-defined different subcarrier spacing is used for PDCCH. Or, in case that the subcarrier spacing of SS block may not be used for control and data transmission, two other subcarrier spacings can be used for indication. The following examples can be considered:

1) SS block SCS=15 kHz→RMSI numerology can be 15 kHz or 30 kHz based on indication 2) SS block SCS=30 kHz→RMSI numerology can be 30 kHz or 60 kHz based on indication 3) SS block SCS=120 kHz→RMSI numerology can be 60 kHz or 120 kHz based on indication 4) SS block SCS=240 kHz→RMSI numerology can be 60 kHz or 120 kHz based on indication (e.g., in case that 240 kHz may not be used for control/data transmission)

Option 4: Joint encoding of the numerology indication field with other field. In this option, the numerology indication and other fields can be jointly encoded, e.g., the location of the RMSI CORESET for PDCCH, and so on.

Some of the above options can be used together to for subcarrier spacing in the different cases. For example, in one frequency band case or one subcarrier spacing case used by SS block, the same subcarrier spacing used by SS block is used for PDCCH. So there may be no need to indicate the subcarrier spacing, i.e., derived implicitly. In another case, different subcarrier spacing may be used and hence explicit indication is needed. The different indication case may require no indication bit or may require different number of indication bits, and hence the interpretation of MIB contents in different cases, e.g., different frequency band case or different synchronization/PBCH subcarrier spacing case, can be different.

RMSI Frequency Resource Indication in MIB

The RMSI can be scheduled by PDCCH and transmitted by PDSCH. Depending on the amount of information of system BW and carrier center frequency indicated in MIB, the UE may have different ways to receive RMSI. There are the following cases 1) The UE can obtain or derive system BW and carrier center frequency from MIB 2) The UE does not know system BW and carrier center frequency from MIB If the UE can obtain or derive the system BW and carrier center frequency from MIB, the PDCCH for RMSI monitoring (more generally a common search space) can be mapped around the carrier center frequency, and the size of RMSI CORESET (PDCCH transmission) BW can be from the SS block bandwidth to the full system bandwidth. The following methods can be considered to indicate the RMSI CORESET BW for PDCCH monitoring:

Option 1: Pre-defined size without indication. Different sizes can be considered for different system BW cases or for different frequency bands. There is a linkage between a system BW in a certain frequency band and the size of BW for PDCCH monitoring. For example, the size can be X when the system BW is less than BW_i, and Y when the system BW is larger than BW_i but less than BW_j, and Z when the system BW is larger than BW_j. The values of X, Y, Z and BW_i, BW_j can be pre-defined.

Option 2: The PDCCH transmission BW can be explicitly indicated. The possible BW options for PDCCH transmission can be pre-defined. For example, the BW options for PDCCH transmission can be selected from the supported system BW cases and/or the supported UE BW case. The BW option for PDCCH transmission is explicitly indicated. The required number of indication can be different for different BW cases.

Option 3: There can be one bit indication to inform that if the BW for PDCCH monitoring is the system BW and a pre-defined BW. An example is that the pre-defined BW is the minimum UE BW to enable that all UEs can receive the RMSI. The pre-defined BW can be different for different system BW cases and different frequency bands.

Option 4: The PDCCH transmission BW can be related to the BW of the SS block. Assuming that BW of the SS block is X, the indication can be a functionality of the BW X, e.g., X, 2X, and so on. The functionality can be different for different cases, e.g., in terms of system BW, and/or frequency band, and so on. The BW can be expressed by the number of RBs, e.g., 24 RBs or 48 RBs or 96 RBs can be considered, since SS block has 24 RBs.

Some of the above options can be used together to for determine the PDCCH transmission BW. For example, in one frequency band case or one subcarrier spacing case used by synchronization and PBCH, no indication of the PDCCH BW is needed and it is pre-defined. In another case, different PDCCH BW options may be used and hence explicit indication is needed. The different indication case may require no indication bit or may require different number of indication bits, and hence the interpretation of MIB contents in different cases, e.g., different frequency band case or different synchronization/PBCH subcarrier spacing case, can be different.

If the UE has no information of the system BW and carrier center frequency from MIB, the PDCCH for RMSI monitoring (more generally a common search space) can be mapped around the SS block center frequency, and the size of PDCCH transmission BW can be restricted. The following methods can be considered to indicate the BW for PDCCH monitoring:

Option 1: Pre-defined size without indication. Different sizes can be considered for different SS block BW cases or for different frequency bands. There is a linkage between a SS block BW in a certain frequency band and the size of BW for PDCCH monitoring.

Option 2: The PDCCH transmission BW can be explicitly indicated. The possible BW options for PDCCH transmission can be pre-defined. For example, the BW options for PDCCH transmission can be selected from the supported minimum system BW cases, and/or the supported minimum UE BW cases, and/or SS block BW. The BW option for PDCCH transmission is explicitly indicated. The required number of indication can be different for different SS block BW cases.

Option 3: There can be one bit indication to inform that if the BW for PDCCH monitoring is the SS block BW or another pre-defined BW. An example is that the pre-defined BW is the minimum UE BW to enable that all UEs can receive the RMSI. The pre-defined BW can be different for different system BW cases and different frequency bands.

Option 4: The PDCCH transmission BW can be related to the BW of the SS block. Assuming that BW of the SS block is X, the indication can be a functionality of the BW X, e.g., X, 2X, and so on. The functionality can be different for different cases, e.g., in terms of system BW, and/or frequency band, and so on. The BW can be expressed by the number of RBs, e.g., 24 RBs or 48 RBs can be considered, since SS block has 24 RBs.

The indication of BW of PDCCH monitoring may include the combinations of the options for PDCCH mapped around the carrier center frequency and the options for PDCCH mapped around the SS block center frequency. Or, 1 bit can be first indicated that the PDCCH is mapped around the carrier center frequency or the SS block center frequency. Then the following field further indicates the BW option for PDCCH monitoring.

If there is no restriction to always map the PDCCH location around the carrier center frequency or the center frequency detected based on PSS/SSS/PBCH, the PDCCH transmission can be located in the system BW in a more flexible manner. The PDCCH location information needs to be additionally signaled. The following PDCCH location information can be signaled.

Option 1: The offset between a reference location for PDCCH transmission and a reference location of SS block can be signaled. For the SS block, the reference location can be the center of the SS block, or the RB which is closest to the SS block center, or the RB in the edge side of the SS block, e.g., the lower frequency edge side or the higher frequency edge side. For example, the offset can be defined in terms of PRBs with certain reference numerology, e.g., the one used by SS block or the one used by PDCCH based on a pre-defined rule. Or, the smaller numerology (subcarrier spacing among SS block and indicated RMSI PDCCH) can be used as the reference numerology since it provides finer granularity. It helps to indicate the offset required for RB alignment among different subcarrier spacing cases. A number of pre-defined offset cases can be signaled. For example, 2 bits can be used to indicate an offset of {0, +1, −1, reserved} PRBs, compared to the center of SS block. The reserved case can be used for other purpose, e.g., it may indicate there is no RMSI transmission. Or, 2 bits can be used to indicate 4 different offset case, e.g., {0, 1, 2, 3} PRBs, compared to the center of SS block. Depending on the number of required offset cases, the number of signaling bits can be different.

Option 2: The offset between a reference location for PDCCH transmission and a reference location of SS block can be implicitly derived based on a pre-defined function. For example, the offset in terms of RB can be a function of the cell ID derived from PSS/SSS, e.g., offset=mod(Cell_ID, N)+M, where N and M are a pre-defined number. For example N can be 3, and M can be −1, which provides 3 different offset, can be used for different sector cases. Other parameters can be used according to the system requirement.

In above Option 1, it is assumed that the SS block is at least aligned with the RB grid of the subcarrier spacing used by the SS block.

FIGS. 31a, 31b and 31c are examples of indication of RMSI CORESET frequency location.

As shown in FIG. 31a, the SS block occupy 24 RBs with subcarrier spacing f, and aligned with the RB grid of the subcarrier spacing f. Therefore, the SS block center is at least aligned with the RB grid of SS block subcarrier spacing f and lower subcarrier spacings, e.g., f/2. In case of larger subcarrier spacing case, e.g., 2f, the center of SS block may not align with the corresponding RB grid. It can be aligned with the RB boundary or located in the center of a RB. Therefore, the indicated offset with granularity of one PRB based on a smaller SCS can be considered as a way to enable RB alignment for RMSI CORESET. The granularity of one PRB based on SS block SCS is also possible. For RMSI CORESET with smaller SCS, e.g., f/2, the offset can be based on the corresponding SCS itself (which means the lower SCS between SS Block SCS and indicated RMSI CORESET SCS), as shown in FIG. 31a. In this case, the granularity of indicated offset can be determined by the indicated SCS for RMSI CORESET. Or, the offset can be always based on the SS block SCS, as shown in FIG. 31b. Depending on the supported RMSI CORESET SCS, the required number of offset cases can be different. For example, if there is possibility that the RMSI CORESET SCS can be 4 times of the SS block SCS, at least 4 offset cases need to be indicated to allow RB grid alignment in all possible cases, as shown in FIG. 31c. In FIGS. 31a, 31b and 31c, only some possible examples of RMSI CORESET SCS and offset cases are shown. The offset cases can be predefined based on the system requirement, which is extendable by considering the rule, such as RB grid alignment among different subcarrier spacing cases.

FIG. 32 shows UE procedure to obtain RMSI CORESET frequency resource location information.

Referring to FIG. 32, UE detects SS block at operation 3210. The UE decodes MIB, and obtains information of RMSI SCS, frequency location information and other related information at 3220. The UE determines the reference location and RB grid information of RMSI CORESET based on SCS and offset information at operation 3230. The UE determines full information of CORESET frequency location based on bandwidth at operation 3240.

To reduce the signaling overhead, the RMSI CORESET subcarrier spacing and frequency location can be jointly encoded. For example, when the RMSI CORESET subcarrier spacing is the same or less than the SS block subcarrier spacing, the offset can be 0. For the case that RMSI CORESET subcarrier spacing is larger than the SS block subcarrier spacing, the offset can be further indicated to allow RB alignment.

FIG. 33 shows an example of indication of limited cases of RMSI CORESET frequency location.

Specifically, FIG. 33 shows the example where a subset of the possible indication cases in FIGS. 31a, 31b and 31c is illustrated. So, 2 bits can be used to indicate the subcarrier spacing and offset case jointly.

If it is not always the case that the SS block is aligned with RB grid, e.g., 24 RBs in a SS block can span 25 RBs with some offset of several subcarriers, the reference position can be defined within the 25 RBs which contains SS block. The subcarrier offset can be separately indicated in MIB to enable UE know the actual RB grid given the SS block subcarrier spacing. So based on the detected SS block location, and indicated subcarrier offset between SS block and actual RB grid, the UE can know the RB grid of the 25 RBs containing SS Block. The reference location to indicate offset of RMSI CORESET can be based on a certain RB location, e.g., the 13$^{th}$ RB which is the RBs in the middle of 25 RBs, or the 1$^{st}$ RB or 25$^{th}$ RB in the edge side. The reference location can be referring to one side boundary of a reference RB or the center of a reference RB, based on a pre-defined rule. The reference location of RMSI CORESET can be determined by an offset from the reference location of the SS block (25 RBs).

FIG. 34 shows another example of indication of RMSI CORESET frequency location.

As shown in the example of FIG. 34, the reference location of SS block is the edge side of the 13$^{th}$ RB in the 25 RBs containing SS-block, and the reference location of RMSI CORESET is its center. Based on the indicated offset in terms of RBs, the RMSI CORESET location can be derived. With the indicated or pre-defined CORESET BW, the frequency location of RMSI CORESET can be determined.

Similarly, to reduce the signaling overhead, the RMSI CORESET subcarrier spacing and frequency location can be jointly encoded. For example, when the RMSI CORESET subcarrier spacing is the same or less than the SS block subcarrier spacing, the offset can be 0. For the case that RMSI CORESET subcarrier spacing is larger than the SS block subcarrier spacing, the offset can be further indicated to allow RB alignment.

In the indication cases above, it mainly consider the cases that the center position of RMSI CORESET is close to the SS block center, with some potential offset due to different numerology or unaligned RB grid. It is also possible to include other cases for possible RMSI CORESET locations, e.g., frequency division multiplexing (FDM) with SS block. For example, the RMSI CORESET can be located in a set of RBs above the SS block or below the SS block.

FIGS. 35, 36 and 37 show examples of indication cases of RMSI CORESET frequency location.

As shown in FIG. 35, there can be a further offset between the edges of SS block and RMSI CORESET, e.g., 0 or 1 RBs to enable RB grid alignment. Since different numerologies may be FDMed, there is potential interference from each other. To consider this in the CORESET location configuration, some guard band can be considered. For example in FIG. 36, in case of larger subcarrier case, the offset can be 1 or 2 RBs to ensure that at least 1 RB can be used as a guard band between SS Block and RMSI CORESET in FDM case.

If it is not always the case that the SS block is aligned with RB grid, e.g., 24 RBs in a SS block can span 25 RBs with some offset of several subcarriers, the reference position can be defined within the 25 RBs which contains SS block. Similarly, the reference location can be based on a certain RB location, e.g., the 1$^{st}$ RB or 25$^{th}$ RB in the edge side. The reference location can be referring to one side boundary of a reference RB or the center of a reference RB, based on a pre-defined rule. The reference location of RMSI CORESET can be determined by an offset from the reference location of the SS block (25 RBs), as shown in the example of FIG. 37.

A set of the potential RMSI CORESET locations considering the above cases can be indicated in the MIB, e.g., cases around the SS block center, and/or cases of FMD with SS block.

FIG. 38 shows an example of RMSI CORESET location cases for the same subcarrier spacing case.

The example shown in FIG. 38 provides some possible cases for RMSI CORESET location when the subcarrier spacing is the same as the SS block.

FIG. 39 shows an example of RMSI CORESET location cases for the different subcarrier spacing case.

The example shown in FIG. 39 illustrates some possible cases for RMSI CORESET location when the subcarrier spacing is twice of that of the SS block. It is possible to use 3 bits to indicate the possible cases for each subcarrier spacing case.

In FIGS. 38 and 39, the example is for the case that SS Block is aligned with the actual RB grid. In case that the SS Block may not be aligned with actual RB grid, the indication can be defined in a similar way by defining the specific reference location for SS block and RMSI CORESET. To further reduce the signaling overhead, the subcarrier spacing, frequency location, BW, time domain information can be separately indicated or partially/fully encoded based on the signaling requirement.

RMSI Time Resource Indication in MIB

The RMSI CORESET time domain information can be defined by the starting symbol in the slot, and the number of symbols for the CORESET. The starting symbol can be the 1$^{st}$ OFDM symbol in the slot, or aligned with the first symbol of the SS block(s) in a slot, or the starting symbol can be the 1$^{st}$ OFDM symbol after the SS block(s) in a slot. The number of symbols for CORESET can be 1, 2 or 3. The CORESET starting OFDM symbol and duration can be separately indicated, or jointly indicated, or encoded jointly with other parameters, e.g., CORESET subcarrier spacing and/or CORESET frequency resource information.

The periodicity of RMSI transmission can be fixed in the specification, e.g., 80 ms. The periodicity of RMSI transmission can be pre-defined per frequency range, e.g., 80 ms for below-6 GHz and 160 ms for above-6 GHz. Or, the periodicity of RMSI transmission it can be configured based on a pre-defined set of periodicity values. The periodicity values can be an integer multiple of PBCH transmission periodicity. The configuration is indicated in MIB, e.g., $\log_2 M$ bits to indicate M periodicity possibilities. Different set of periodicity values can be used in different frequency ranges, and hence the number of indications can be different.

During a RMSI period, there can be one or multiple RMSI transmissions, which can be the repeated transmissions, or beam-swept transmissions. The number of RMSI transmissions can be fixed or pre-defined per frequency range. Or, the number of RMSI transmission can be determined by the periodicity, if there are multiple possible periodicities. Similarly, the number of RMSI transmission can be configured based on a pre-defined set of transmission number values. Different set of transmission number values can be used in different RMSI periodicity cases and can be different in different frequency ranges, and hence the number of indications can also be different. The configuration of the transmission number can be indicated in MIB, e.g., $\log_2 N$ bits to indicate N possibilities.

Given the RMSI periodicity of P radio frames and number of RMSI transmissions of R per period, the time information for RMSI transmission, e.g., frame index, subframe or slot index, and so on, can be derived based on a pre-defined rule. The frame duration can be pre-defined, e.g., 10 ms. The subframe duration can be pre-defined, e.g., 1 ms. The slot duration can be defined by a pre-defined number of OFDM symbols based on the numerology used by the SS block, e.g., 14 symbols. If there is a configured numerology for RMSI transmission in MIB, the slot duration can be defined by a pre-defined number of OFDM symbols based on the configured numerology. If the slot duration can be configurable, it can be indicated in the MIB.

During a RMSI period with P radio frames, the R times of RMSI transmissions can be located in N frames, and each frame includes r RMSI transmissions, where R=Nr, N≥1, r≥1. Given the RMSI period with P radio frames, N and r can be determined by a pre-defined rule. In some scenarios, one value can be pre-defined or implicitly derived based on the RMSI period or number of RMSI transmissions and another value can be derived accordingly. For example, if a certain condition is satisfied, e.g., the number of RMSI transmission R is equal to or less than the RMSI period P, it can be assumed that there is one RMSI transmission in one frame, i.e., r=1, and hence the number of frames for RMSI transmission is $$N = \frac{R}{r}.$$

During the RMSI period with P radio frames, there can be one RMSI transmission every d radio frames, where $$d = \frac{P}{N}.$$

If P<R, there are multiple RMSI transmissions in a radio frame. For example, there can be $$r = \frac{R}{p}$$

RMSI transmissions every radio frame. Or, there can be pre-defined or a configured number of r RMSI transmissions in a radio frame, and hence there are $$N = \frac{R}{r}$$

radio frames for RMSI transmissions. Similarly, during the RMSI period with P radio frames, there can be one RMSI transmission every d radio frames, where $$d = \frac{P}{N}.$$

The frame for RMSI transmission can be obtained by mod(SFN,d)=0. Or, the frame for RMSI transmission can be obtained in a cell-specific manner, e.g., by mod(SFN,d)=mod($N_{cell}^{ID}$,d), which $N_{cell}^{ID}$ is the physical cell ID derived based on PSS and SSS. The set of slots or subframes in the frame for RMSI transmission can be pre-defined. The set of slots or subframes in the frame for RMSI transmission can be configurable by 1 bit indication that if the RMSI transmission frames are determined by a pre-defined rule or a cell-specific manner. For example, based on 1 bit configuration, the UE knows that the mapping is pre-defined or cell-specific.

The slot or subframe in the frame for RMSI transmission can be pre-defined based on a look-up table. For example, if there is one RMSI transmission in a radio frame, the pre-defined slot index is $n_1$. If there are two RMSI transmissions in a radio frame, another slot with index $n_2$ is additionally configured. Or, another two pre-defined slots (different from $n_1$) can be configured.

| Transmissions in a radio frame | Slot index in the radio frame |
| --- | --- |
| r = 1 | $n_1$ |
| r = 2 | $n_1, n_2$ |
| r = 3 | $n_1, n_2, n_3$ |
| r = 4 | $n_1, n_2, n_3, n_4$ |
| ... | ... |
| r = $r_i$ | $n_1, n_2, n_3, \ldots, n_{ri}$ |

There can be a pre-defined pattern applied to multiple RMSI transmissions. For example, for single beam based RMSI transmission, to obtain diversity from channel coding, different redundancy version of the coded bits of RMSI massage can be used in the different RMSI transmissions. The orders of the used redundancy versions can be pre-defined for different number of RMSI transmissions. Or, the redundancy version of a certain RMSI transmission can be a function of the radio frame number and/or the subframe/slot index of the corresponding RMSI transmission. The UE can combine the RMSI transmissions with different redundancy versions in a RMSI period for decoding. If the RMSI transmissions in a RMSI period are based on beam sweeping, i.e., each transmission is applied with one or multiple distinct transmission (TX) beams, the pattern of applied beams can be the same as the pattern applied in the SS blocks in the SS period. One bit can be used to indicate if there is association of the pattern of applied beams in RMSI transmissions as the pattern used for SS blocks. If it is indicated that there is association, the pattern of the applied beams in the RMSI transmission can be determined by the beam patterns of the SS blocks. For example, if the number of RMSI transmissions in a RMSI period is the same as the number of SS blocks in a SS burst period, it can be assumed that the same set of beams is used for SS block and RMSI, and the order of the used beams is the same. If the number of RMSI transmissions is less than the number of SS blocks in a SS burst period, e.g., M times smaller, it can be assumed that the same set of beams is used for SS block and RMSI, but one beam for one RMSI transmission is composed of a composite beam of M beams used for M SS block transmissions. There is a sequential mapping order between the beams used for SS block transmission and RMSI transmission.

The overall indication of RMSI transmission can be defined by a set of indices; each corresponds to a set of parameters for RMSI transmission, e.g., a predefined periodicity, a pre-defined number of RMSI transmissions in the period, etc. An example is shown in the look-up table below. Different configuration table with different parameters (e.g., periodicity and number of RMSI transmissions) can be used for different frequency bands. The number of incitation bits can be determined by the number of configuration indices; e.g., $\log_2 N$ bits for maximum of iv configurations. Some parameters can be implicitly derived, e.g., the patterns of multiple RMSI transmissions based on a pre-define rule. After UE obtains the configuration index, the UE derives the configuration parameters of RMSI transmissions for receiving RMSI.

| Configuration Index | Periodicity | Total number of RMSI transmissions | Number of RMSI transmissions in a radio frame | Transmission Pattern |
|---|---|---|---|---|
| 0 | $P_0$ | $R_0$ | $r_0$ | $Pattern_0$ |
| 1 | $P_1$ | $R_0$ | $r_0$ | $Pattern_1$ |
| 2 | $P_0$ | $R_1$ | $r_1$ | $Pattern_0$ |
| 3 | $P_1$ | $R_1$ | $r_1$ | $Pattern_1$ |
| ... | ... | ... | ... | ... |

FIG. 40 is a block diagram of a terminal according to an embodiment of the disclosure.

Referring to FIG. 40, a terminal includes a transceiver 4010, a controller 4020 and a memory 4030. The transceiver 4010, the controller 4020 and the memory 4030 are configured to perform the operations of the UE illustrated in FIGS. 1 to 39, or described above. Although the transceiver 4010, the controller 4020 and the memory 4030 are shown as separate entities, they may be realized as a single entity like a single chip. The transceiver 4010, the controller 4020 and the memory 4030 may be electrically connected to or coupled with each other.

The transceiver 4010 may transmit and receive signals to and from the other network entities, e.g. a base station.

The controller 4020 may control the terminal to perform a function according to one of the embodiments described above. For example, the controller 4020 may be configured to control the transceiver 4010 to receive a SS block including at least one synchronization signal (e.g., PSS/SSS) and a broadcast channel (e.g., (NR-)PBCH) from the base station, identify an offset between the SS block and a RB grid from system information in the broadcast channel, and determine the RB grid based on the offset. The controller 4020 may be configured to control the transceiver to receive the offset in a master information block through the broadcast channel. The offset may be a 4-bit PRB grid offset. The offset may be defined based on a lowest subcarrier in the SS block. The controller 4020 may refer to a circuitry, an application-specific integrated circuit (ASIC), or at least one processor.

In an embodiment, the operations of the terminal may be implemented using the memory 4030 storing corresponding program codes. Specifically, the terminal may be equipped with the memory 4030 to store program codes implementing desired operations. To perform the desired operation, the controller 4020 may read and execute the program codes stored in the memory 4030 by using a processor or a central processing unit (CPU).

FIG. 41 is a block diagram of a base station according to an embodiment of the disclosure.

Referring to FIG. 41, a base station includes a transceiver 4110, a controller 4120 and a memory 4130. The transceiver 4110, the controller 4120 and the memory 4130 are configured to perform the operations of the network (e.g. gNB) illustrated in FIGS. 1 to 39, or described above. Although the transceiver 4110, the controller 4120 and the memory 4130 are shown as separate entities, they may be realized as a single entity like a single chip. The transceiver 4110, the controller 4120 and the memory 4130 may be electrically connected to or coupled with each other.

The transceiver 4110 may transmit and receive signals to and from the other network entities, e.g. a terminal.

The controller 4120 may control the base station to perform a function according to one of the embodiments described above. For example, the controller 4120 may control to determine a RB grid and a location of a SS block including at least one synchronization signal (e.g., PSS/SSS) and a broadcast channel (e.g., (NR-)PBCH)), control the transceiver 4110 to transmit the SS block based on the RB grid to the terminal, and control the transceiver 4110 to transmit an offset between the SS block and the RB grid in system information through the broadcast channel to the terminal.

The controller 4120 may refer to a circuitry, an application-specific integrated circuit (ASIC), or at least one processor.

In an embodiment, the operations of the base station may be implemented using the memory 4130 storing corresponding program codes. Specifically, the base station may be equipped with the memory 4130 to store program codes implementing desired operations. To perform the desired operation, the controller 4120 may read and execute the program codes stored in the memory 1530 by using a processor or a central processing unit (CPU).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method performed by a terminal in a wireless communication system, the method comprising:
   receiving, from a base station, a synchronization signal block (SSB) including at least one synchronization signal and a physical broadcast channel (PBCH);
   identifying a subcarrier offset between the SSB and a resource block (RB) grid based on system information on the PBCH; and
   identifying a location of the SSB based on the subcarrier offset,
   wherein the subcarrier offset is defined by a number of subcarriers from a lowest subcarrier in a lowest RB overlapping with the SSB to a lowest subcarrier in the SSB.

2. The method of claim 1, wherein a value indicating the subcarrier offset is included in a master information block on the PBCH.

3. The method of claim 1, wherein the subcarrier offset is indicated by a 4-bit value.

4. The method of claim 1, wherein information on the lowest RB is included in a system information block 1 received from the base station.

5. A method performed by a base station in a wireless communication system, the method comprising:
   determining a resource block (RB) grid and a location of a synchronization signal block (SSB) including at least one synchronization signal and a physical broadcast channel (PBCH); and
   transmitting, to a terminal, the SSB based on the RB grid,
   wherein information on a subcarrier offset between the SSB and the RB grid is transmitted in system information on the PBCH, and
   wherein the subcarrier offset is defined by a number of subcarriers from a lowest subcarrier in a lowest RB overlapping with the SSB to a lowest subcarrier in the SSB.

6. The method of claim 5, wherein a value indicating the subcarrier offset is included in a master information block on the PBCH.

7. The method of claim 5, wherein the subcarrier offset is indicated by a 4-bit value.

8. The method of claim 5, wherein information on the lowest RB is included in a system information block 1 transmitted to the terminal.

9. A terminal in a wireless communication system, the terminal comprising:
   a transceiver configured to transmit and receive signals; and
   a controller coupled with the transceiver and configured to:
      receive, from a base station, a synchronization signal block (SSB) including at least one synchronization signal and a physical broadcast channel (PBCH),
      identify a subcarrier offset between the SSB and a resource block (RB) grid based on system information on the PBCH, and
      identify a location of the SSB based on the subcarrier offset,
   wherein the subcarrier offset is defined by a number of subcarriers from a lowest subcarrier in a lowest RB overlapping with the SSB to a lowest subcarrier in the SSB.

10. The terminal of claim 9, wherein a value indicating the subcarrier offset is included in a master information block on the PBCH.

11. The terminal of claim 9, wherein the subcarrier offset is indicated by a 4-bit value.

12. The terminal of claim 9, wherein information on the lowest RB is included in a system information block 1 received from the base station.

13. A base station in a wireless communication system, the base station comprising:
   a transceiver configured to transmit and receive signals; and
   a controller coupled with the transceiver and configured to:
      determine a resource block (RB) grid and a location of a synchronization signal block (SSB) including at least one synchronization signal and a physical broadcast channel (PBCH), and
      transmit, to a terminal, the SSB based on the RB grid,
   wherein information on a subcarrier offset between the SSB and the RB grid is transmitted in system information on the PBCH, and
   wherein the subcarrier offset is defined by a number of subcarriers from a lowest subcarrier in a lowest RB overlapping with the SSB to a lowest subcarrier in the SSB.

14. The base station of claim 13, wherein a value indicating the subcarrier offset is included in a master information block on the PBCH.

15. The base station of claim 13, wherein information on the lowest RB is included in a system information block 1 transmitted to the terminal.

* * * * *